(12) United States Patent
Smith

(10) Patent No.: US 8,998,428 B2
(45) Date of Patent: Apr. 7, 2015

(54) RETROREFLECTIVE SHEETING INCLUDING CUBE CORNER ELEMENTS

(71) Applicant: 3M Innovative Properties Company, St. Paul, MN (US)

(72) Inventor: Kenneth L. Smith, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 14/504,471

(22) Filed: Oct. 2, 2014

(65) Prior Publication Data

US 2015/0022890 A1  Jan. 22, 2015

Related U.S. Application Data

(60) Continuation of application No. 14/210,530, filed on Mar. 14, 2014, now Pat. No. 8,851,686, which is a division of application No. 14/160,051, filed on Jan. 21, 2014, now Pat. No. 8,714,757, which is a division (Continued)

(51) Int. Cl.
*G02B 5/122* (2006.01)
*G02B 5/124* (2006.01)
*G02B 1/10* (2006.01)

(52) U.S. Cl.
CPC .............. *G02B 5/124* (2013.01); *G02B 1/105* (2013.01)

(58) Field of Classification Search
CPC ........... G02B 5/122; G02B 5/124; B32B 3/00
USPC ............................. 359/529, 530; 264/1.6, 1.9; 428/167–169, 172
See application file for complete search history.

(56) References Cited

U.S. PATENT DOCUMENTS

| | | |
|---|---|---|
| 488,636 A | 12/1892 | Prentiss |
| 835,648 A | 11/1906 | Straubel |
| 1,591,572 A | 7/1926 | Stimson |
| 1,671,086 A | 5/1928 | Stimson |
| 1,848,675 A | 3/1932 | Stimson |
| 2,310,790 A | 2/1943 | Jungersen |
| 3,069,721 A | 12/1962 | Arni et al. |
| 3,541,606 A | 11/1970 | Heenan et al. |
| 3,649,153 A | 3/1972 | Brudy |
| 3,684,348 A | 8/1972 | Rowland |
| 3,689,346 A | 9/1972 | Rowland |
| 3,712,706 A | 1/1973 | Stamm |

(Continued)

FOREIGN PATENT DOCUMENTS

| CA | 785139 | 5/1968 |
|---|---|---|
| DE | 42 36 799 A1 | 5/1994 |

(Continued)

OTHER PUBLICATIONS

Chandler, On the Effects of Small Errors in the Angles of Corner-Cube Reflectors, J. of Optical Soc. of America, vol. 50, No. 3, pp. 203-206, (Mar. 1960).

(Continued)

*Primary Examiner* — Euncha Cherry
(74) *Attorney, Agent, or Firm* — Trisha D. Adamson

(57) ABSTRACT

The present disclosure is directed to lamina(e) comprising cube corner elements, a tool comprising an assembly of laminae and replicas thereof. The disclosure further relates to retroreflective sheeting.

9 Claims, 15 Drawing Sheets

Related U.S. Application Data of application No. 14/040,838, filed on Sep. 30, 2013, now Pat. No. 8,708,504, which is a division of application No. 13/430,137, filed on Mar. 26, 2012, now Pat. No. 8,573,789, which is a division of application No. 13/208,988, filed on Aug. 12, 2011, now Pat. No. 8,251,525, which is a division of application No. 12/758,695, filed on Apr. 12, 2010, now Pat. No. 8,016,435, which is a division of application No. 12/489,056, filed on Jun. 22, 2009, now Pat. No. 7,722,197, which is a continuation of application No. 11/931,193, filed on Oct. 31, 2007, now Pat. No. 7,556,386, which is a continuation of application No. 11/832,908, filed on Aug. 2, 2007, now Pat. No. 7,329,012, which is a division of application No. 11/534,923, filed on Sep. 25, 2006, now Pat. No. 7,422,334, which is a division of application No. 10/404,890, filed on Apr. 1, 2003, now Pat. No. 7,156,527.

(60) Provisional application No. 60/452,464, filed on Mar. 6, 2003.

(56) References Cited

U.S. PATENT DOCUMENTS

| | | | |
|---|---|---|---|
| 3,812,706 A | 5/1974 | Higgs et al. | |
| 3,817,596 A | 6/1974 | Tanaka | |
| 3,833,285 A | 9/1974 | Heenan | |
| 3,873,184 A | 3/1975 | Heenan | |
| 3,923,378 A | 12/1975 | Heenan | |
| 3,924,928 A | 12/1975 | Trimble | |
| 3,926,402 A | 12/1975 | Heenan | |
| 4,025,159 A | 5/1977 | McGrath | |
| RE29,396 E | 9/1977 | Heenan | |
| 4,066,236 A | 1/1978 | Lindner | |
| 4,066,331 A | 1/1978 | Lindner | |
| 4,095,773 A | 6/1978 | Lindner | |
| T987,003 I4 | 10/1979 | Johnson et al. | |
| 4,202,600 A | 5/1980 | Burke et al. | |
| 4,208,090 A | 6/1980 | Heenan | |
| 4,243,618 A | 1/1981 | Van Arnam | |
| 4,244,683 A | 1/1981 | Rowland | |
| 4,349,598 A | 9/1982 | White | |
| 4,478,769 A | 10/1984 | Pricone et al. | |
| 4,486,363 A | 12/1984 | Pricone et al. | |
| 4,576,850 A | 3/1986 | Martens | |
| 4,582,885 A | 4/1986 | Barber | |
| 4,588,258 A | 5/1986 | Hoopman | |
| 4,601,861 A | 7/1986 | Pricone et al. | |
| 4,633,567 A | 1/1987 | Montalbano | |
| 4,668,558 A | 5/1987 | Barber | |
| 4,703,999 A | 11/1987 | Benson | |
| 4,775,219 A | 10/1988 | Appeldorn et al. | |
| 4,895,428 A | 1/1990 | Nelson et al. | |
| 4,938,563 A | 7/1990 | Nelson et al. | |
| 4,989,948 A | 2/1991 | Dreyer, Jr. | |
| 5,117,304 A | 5/1992 | Huang et al. | |
| 5,122,902 A | 6/1992 | Benson | |
| 5,138,488 A | 8/1992 | Szczech | |
| 5,156,863 A | 10/1992 | Pricone et al. | |
| 5,171,624 A | 12/1992 | Walter | |
| 5,450,235 A | 9/1995 | Smith et al. | |
| 5,565,151 A | 10/1996 | Nilsen | |
| 5,691,846 A | 11/1997 | Benson, Jr. et al. | |
| 5,706,132 A | 1/1998 | Nestegard et al. | |
| 5,763,049 A | 6/1998 | Frey | |
| 5,822,121 A | 10/1998 | Smith et al. | |
| 5,840,406 A | 11/1998 | Nilsen | |
| 5,898,523 A | 4/1999 | Smith et al. | |
| 5,914,812 A | 6/1999 | Benson et al. | |
| 5,936,770 A | 8/1999 | Nestegard et al. | |
| 5,946,134 A | 8/1999 | Benson et al. | |
| 5,948,488 A | 9/1999 | Marecki et al. | |
| 5,981,032 A | 11/1999 | Smith et al. | |
| 6,010,609 A | 1/2000 | Mimura et al. | |
| 6,015,214 A * | 1/2000 | Heenan et al. | 359/529 |
| 6,114,009 A | 9/2000 | Smith | |
| 6,120,280 A | 9/2000 | Mimura et al. | |
| 6,136,416 A | 10/2000 | Smith et al. | |
| 6,159,407 A | 12/2000 | Krinke et al. | |
| 6,253,442 B1 | 7/2001 | Benson et al. | |
| 6,257,860 B1 | 7/2001 | Luttrell et al. | |
| 6,302,992 B1 | 10/2001 | Smith et al. | |
| 6,318,866 B1 | 11/2001 | Mimura et al. | |
| 6,318,987 B1 | 11/2001 | Luttrell et al. | |
| 6,386,855 B1 | 5/2002 | Luttrell et al. | |
| 6,447,878 B1 | 9/2002 | Smith et al. | |
| 6,540,367 B1 | 4/2003 | Benson et al. | |
| 6,592,967 B2 | 7/2003 | Kaufman | |
| 6,652,954 B2 | 11/2003 | Nielsen et al. | |
| 6,770,225 B2 | 8/2004 | Nilsen et al. | |
| 6,817,724 B2 | 11/2004 | Mimura et al. | |
| 6,884,371 B2 | 4/2005 | Smith | |
| 6,902,280 B2 | 6/2005 | Couzin | |
| 6,984,047 B2 | 1/2006 | Couzin et al. | |
| 7,152,983 B2 | 12/2006 | Smith | |
| 7,156,527 B2 | 1/2007 | Smith | |
| 7,174,619 B2 | 2/2007 | Smeenk et al. | |
| 7,188,960 B2 | 3/2007 | Smith | |
| 7,410,604 B2 | 8/2008 | Erickson et al. | |
| 7,556,386 B2 | 7/2009 | Smith | |
| 2001/0009475 A1 | 7/2001 | Benson | |
| 2001/0036533 A1 | 11/2001 | Smith | |
| 2002/0028263 A1 | 3/2002 | Luttrell | |

FOREIGN PATENT DOCUMENTS

| | | |
|---|---|---|
| DE | 42 36 799 C2 | 5/1994 |
| DE | 44 10 994 C2 | 10/1995 |
| EP | 0 790 120 | 8/1997 |
| EP | 0 844 056 | 5/1998 |
| EP | 0 885 705 B1 | 12/1998 |
| EP | 1 164 390 | 12/2001 |
| EP | 1 271 189 | 1/2003 |
| GB | 2027441 | 2/1980 |
| JP | 8309851 | 11/1996 |
| JP | 2001-33609 | 2/2001 |
| KR | 10-0245174 | 2/2000 |
| KR | 2000-0058223 | 10/2000 |
| KR | 2001-0014414 | 2/2001 |
| WO | WO 94/18581 | 8/1994 |
| WO | WO 95/11464 | 4/1995 |
| WO | WO 96/42023 | 12/1996 |
| WO | WO 97/41466 | 11/1997 |
| WO | WO 97/45255 | 12/1997 |
| WO | WO 99/00682 | 1/1999 |
| WO | WO 99/15920 | 4/1999 |
| WO | WO 00/60385 | 10/2000 |
| WO | WO 02/101423 | 12/2002 |
| WO | WO 2004/061489 | 7/2004 |

OTHER PUBLICATIONS

Cooke, Optical Activities in Industry, Applied Optics, vol. 20, No. 8, pp. A80, 1267, and 1268, (Apr. 15, 1981).
Eckhardt, "Simple Model of Corner Reflector Phenomena", Applied Optics, Jul. 1971, vol. 10, No. 7, p. 1559-1566.
Federal Test Method Standard, Instrumental Photometric Measurements of Retroreflective Materials and Retroreflective Devices (Federal Test Method Standard 370, Mar. 1, 1977).
Minato et al., Optical design of a hollow cube-corner retroreflector for geosynchronous satellite, Applied Optics, vol. 40, No. 9, 20. Mar. 2001.
Minato et al., Optical design of cube-corner retroreflectors having curved mirror surfaces, Applied Optics, vol. 31, No. 28, 1. Oct. 1992 abstract; chapter 1, 5; figs. 1-8.
N. E. Rityn, "Optics of Corner Cube Reflectors," Sov. J. Optc. Technol. 34, p. 198-201 (1967).
Yoder, Jr., Study of Light Deviation Errors in Triple Mirrors and Tetrahedral Prisms, J. of Optical Soc. of America, vol. 48, No. 7, pp. 496-499, (Jul. 1958).

(56) References Cited

OTHER PUBLICATIONS

Yuan et al., Design and fabrication of micro-cube-corner array retroreflectors, Optics Communications 209 (2002) 75-83, 1. Aug. 2002 abstract; chapter 1-4; fig. 1.

*3M Company and 3M Innovative Properties Company*, Plaintiffs, v. *Avery Dennison Corporation*, Defendant, Civil No. 10-2630, Document 230, Memorandum Opinion and Order, filed Mar. 22, 2012, pp. 1-38.

* cited by examiner

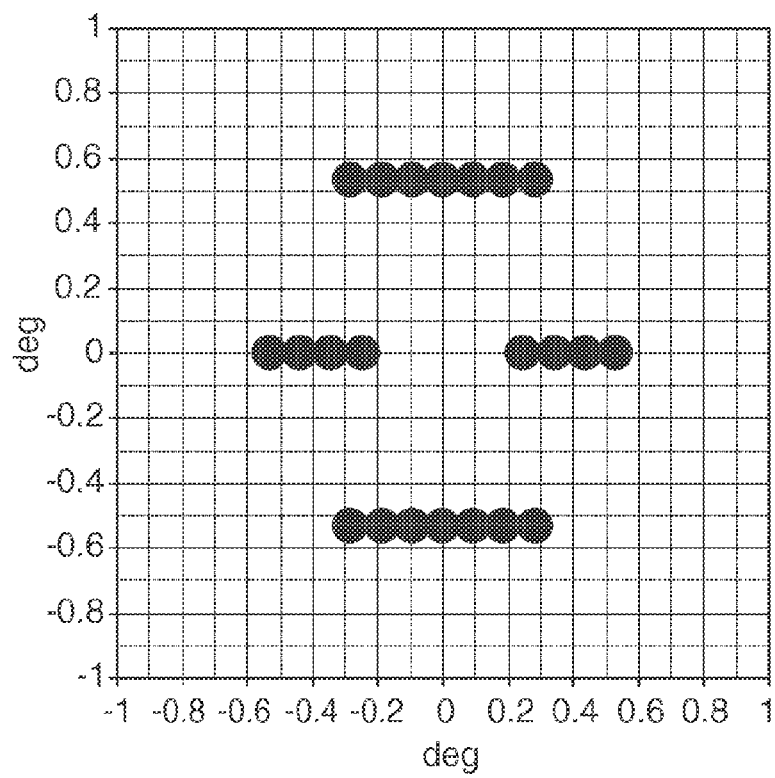
Fig. 26
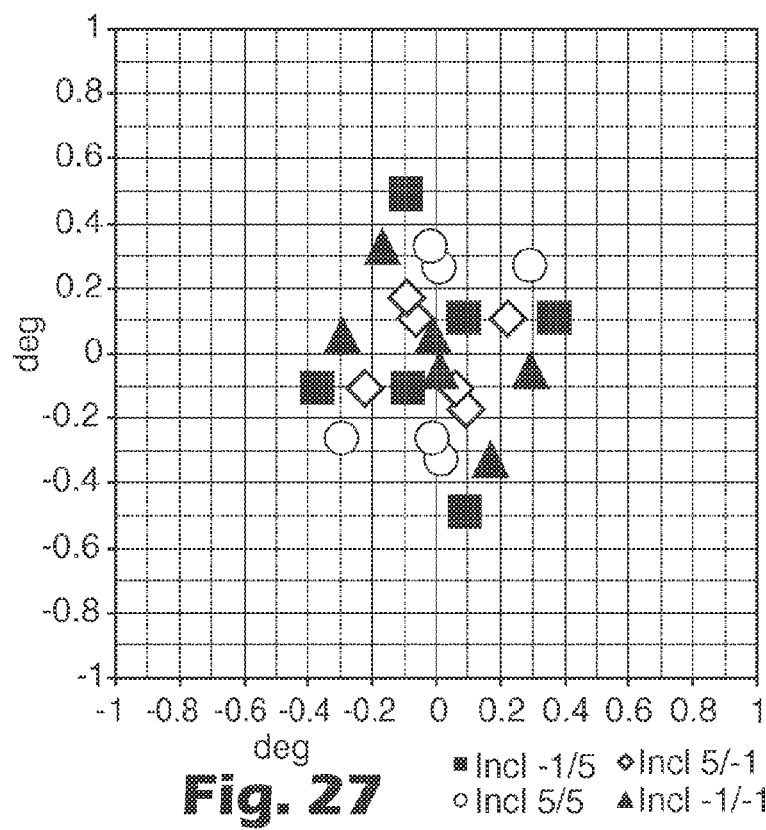
Fig. 27  ■ Incl -1/5  ◇ Incl 5/-1  ○ Incl 5/5  ▲ Incl -1/-1

RETROREFLECTIVE SHEETING INCLUDING CUBE CORNER ELEMENTS

TECHNICAL FIELD

The present disclosure is directed to retroreflective sheeting comprising cube corner elements, a lamina including cube corner elements, tools comprising an assembly of lamina; and replications thereof including in particular retroreflective sheeting.

BACKGROUND

Retroreflective materials are characterized by the ability to redirect light incident on the material back toward the originating light source. This property has led to the widespread use of retroreflective sheeting for a variety of traffic and personal safety uses. Retroreflective sheeting is commonly employed in a variety of articles, for example, road signs, barricades, license plates, pavement markers and marking tape, as well as retroreflective tapes for vehicles and clothing.

Two known types of retroreflective sheeting are microsphere-based sheeting and cube corner sheeting. Microsphere-based sheeting, sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Due to the symmetrical geometry of beaded retroreflectors, microsphere based sheeting exhibits the same total light return regardless of orientation, i.e., when rotated about an axis normal to the surface of the sheeting. Thus, such microsphere-based sheeting has a relatively low sensitivity to the orientation at which the sheeting is placed on a surface. In general, however, such sheeting has a lower retroreflective efficiency than cube corner sheeting.

Cube corner retroreflective sheeting typically comprises a thin transparent layer having a substantially planar front surface and a rear structured surface comprising a plurality of geometric structures, some or all of which include three reflective faces configured as a cube corner element.

Cube corner retroreflective sheeting is commonly produced by first manufacturing a master mold that has a structured surface, such structured surface corresponding either to the desired cube corner element geometry in the finished sheeting or to a negative (inverted) copy thereof, depending upon whether the finished sheeting is to have cube corner pyramids or cube corner cavities (or both). The mold is then replicated using any suitable technique such as conventional nickel electroforming to produce tooling for forming cube corner retroreflective sheeting by processes such as embossing, extruding, or cast-and-curing. U.S. Pat. No. 5,156,863 (Pricone et al.) provides an illustrative overview of a process for forming tooling used in the manufacture of cube corner retroreflective sheeting. Known methods for manufacturing the master mold include pin-bundling techniques, direct machining techniques, and techniques that employ laminae.

In pin bundling techniques, a plurality of pins, each having a geometric shape such as a cube corner element on one end, are assembled together to form a master mold. U.S. Pat. No. 1,591,572 (Stimson) and U.S. Pat. No. 3,926,402 (Heenan) provide illustrative examples. Pin bundling offers the ability to manufacture a wide variety of cube corner geometries in a single mold, because each pin is individually machined. However, such techniques are impractical for making small cube corner elements (e.g., those having a cube height less than about 1 millimeter) because of the large number of pins and the diminishing size thereof required to be precisely machined and then arranged in a bundle to form the mold.

In direct machining techniques, a series of grooves are formed in the surface of a planar substrate (e.g., metal plate) to form a master mold comprising truncated cube corner elements. In one well known technique, three sets of parallel grooves intersect each other at 60 degree included angles to form an array of cube corner elements, each having an equilateral base triangle (see U.S. Pat. No. 3,712,706 (Stamm)). In another technique, two sets of grooves intersect each other at an angle greater than 60 degrees and a third set of grooves intersects each of the other two sets at an angle less than 60 degrees to form an array of canted cube corner element matched pairs (see U.S. Pat. No. 4,588,258 (Hoopman)). In direct machining, a large number of individual faces are typically formed along the same groove formed by continuous motion of a cutting tool. Thus, such individual faces maintain their alignment throughout the mold fabrication procedure. For this reason, direct machining techniques offer the ability to accurately machine very small cube corner elements. A drawback to direct machining techniques, however, has been reduced design flexibility in the types of cube corner geometries that can be produced, which in turn affects the total light return.

In techniques that employ laminae, a plurality of thin sheets (i.e., plates) referred to as laminae having geometric shapes formed on one longitudinal edge, are assembled to form a master mold. Techniques that employ laminae are generally less labor intensive than pin bundling techniques because fewer parts are separately machined. For example, one lamina can typically have about 400-1000 individual cube corner elements, in comparison to each pin having only a single cube corner element. However, techniques employing laminae have less design flexibility in comparison to that achievable by pin bundling. Illustrative examples of techniques that employ laminae can be found in EP 0 844 056 A1 (Mimura et al.); U.S. Pat. No. 6,015,214 (Heenan et al.); U.S. Pat. No. 5,981,032 (Smith); and U.S. Pat. No. 6,257,860 (Luttrell).

The base edges of adjacent cube corner elements of truncated cube corner arrays are typically coplanar. Other cube corner element structures, described as "full cubes" or "preferred geometry (PG) cube corner elements", typically comprise at least two non-dihedral edges that are not coplanar. Such structures typically exhibit a higher total light return in comparison to truncated cube corner elements. Certain PG cube corner elements may be fabricated via direct machining of a sequence of substrates, as described in PCT Publication No. WO00/60385. However, it is difficult to maintain geometric accuracy with this multi-step fabrication process. Design constraints may also be evident in the resulting PG cube corner elements and/or arrangement of elements. By contrast, pin bundling and techniques that employ laminae allow for the formation of a variety of shapes and arrangements of PG cube corner elements. Unlike pin bundling, however, techniques that employ laminae also advantageously provide the ability to form relatively smaller PG cube corner elements.

The symmetry axis of a cube corner is a vector that trisects the structure, forming an equal angle with all three cube faces. In the aforementioned truncated cubes of Stamm, the symmetry axis is normal to the equilateral base triangle and the cubes are considered to have no cant or tilt. The nomenclature "forward canting" or "positive canting" has been used in the cube corner arts to describe truncated cube corner elements canted in a manner that increases only one base triangle included angle relative to 60°. Conversely, the nomenclature "backward canting" or "negative canting" has been used in the cube corner arts to describe cube corner elements canted in a manner that increases two of the included angles of the base triangle relative to 60°. See U.S. Pat. No. 5,565,151 (Nilsen) and U.S. Pat. No. 4,588,258 (Hoopman). Canting of PG cube corner elements is described in U.S. Pat. No. 6,015,214 (Heenan et al.).

Canting cube corner elements either backward or forward enhances entrance angularity. Full cube corner elements have a higher total light return than truncated cube corner elements for a given amount of cant, but the full cubes lose total light return more rapidly at higher entrance angles. One benefit of full cube corner elements is higher total light return at low entrance angles, without substantial loss in performance at higher entrance angles.

A common method for improving the uniformity of total light return (TLR) with respect to orientation is tiling, i.e., placing a multiplicity of small tooling sections in more than one orientation in the final production, as described for example in U.S. Pat. No. 4,243,618 (Van Armin), U.S. Pat. No. 4,202,600; and U.S. Pat. No. 5,936,770 (Nestegard et al.). Tiling can be visually objectionable. Further, tiling increases the number of manufacturing steps in making the tooling employed for manufacture of the sheeting.

In addition to being concerned with the TLR, the performance of retroreflective sheeting also relates to the observation angularity or divergence profile of the sheeting. This pertains to the spread of the retroreflected light relative to the source, i.e., typically, vehicle headlights. The spread of retroreflected light from cube corners is dominated by effects including diffraction, polarization, and non-orthogonality. For this purpose, it is common to introduce angle errors such as described in Table 1 of column 5 of U.S. Pat. No. 5,138,488 (Szczech).

Similarly, Example 1 of EP 0 844 056 A1 (Mimura) describes a fly cutting process in which the bottom angles of V-shaped grooves formed with a diamond cutting tool were slightly varied in regular order, three types of symmetrical V-shaped grooves having depths of 70.6 μm, 70.7 μm and 70.9 μm were successively and repeatedly cut at a repeating pitch of 141.4 μm in a direction perpendicular to the major surfaces of the sheets. Thus, a series of successive roof-shaped projections having three different vertical angles of 89.9°, 90.0°, and 91.0° in a repeating pattern were formed on one edge of the sheets.

Although the art describes a variety of retroreflective designs and their measured or calculated retroreflective performance; industry would find advantage in retroreflective sheeting having new cube corner optical designs and methods of manufacturing, particularly those features that contribute to improved performance and/or improved manufacturing efficiencies.

SUMMARY

One embodiment comprises a lamina comprising cube corner elements having faces formed from grooves wherein adjacent grooves range from being nominally parallel to nonparallel by less than 1°. The adjacent grooves have included angles that differ by at least 2°. In one aspect the included angles of the grooves are arranged in a repeating pattern. In another aspect, the faces of the elements intersect at a common peak height. In yet another aspect, the grooves have bisector planes that range from being mutually nominally parallel to nonparallel by less than 1°.

Another embodiment comprises a lamina comprising preferred geometry cube corner elements wherein at least a portion of the cube corner elements are canted having an alignment angle selected from alignment angles between 45° and 135°, alignment angles between 225° and 315°, and combinations thereof. Preferably, a first cube corner element is canted having an alignment angle between 60° and 120° and a second adjacent cube is canted having an alignment angles between 240° and 300°. Further, the alignment angle of the first cube preferably differs from 0° or 180° by substantially the same amount as the alignment angle of the second cube differs.

In each of these embodiments, the cube corner elements preferably comprise faces formed from alternating pairs of side grooves. The included angle of each pair of side grooves preferably has a sum of substantially 180°. Further, the included angle of a first groove is preferably greater than 90° by an amount of at least about 5° (e.g., about 10° to about 20°) and the included angle of a second adjacent groove is less than 90° by about the same amount.

Another embodiment comprises a lamina having a microstructured surface comprising cube corner elements having faces formed from a side groove set wherein at least two grooves within the set are nonparallel by amounts ranging from greater than nominally parallel to about 1°. The elements preferably comprise dihedral angle errors having magnitudes between 1 arc minute and 60 arc minutes. The dihedral angle errors are preferably arranged in a repeating pattern. The grooves comprise skew and/or inclination that vary in sign and or magnitude.

In all disclosed embodiments, the adjacent grooves are preferably side grooves. Further, the elements preferably each have a face in a common plane that defines a primary groove face. In addition, the elements are preferred geometry cube corner elements.

Other embodiments comprise a master tool comprising a plurality of any one or combination of described lamina. The laminae are preferably assembled such that cube corner elements of adjacent laminae are in opposing orientations. The elements preferably have a shape in plan view selected from trapezoids, rectangles, parallelograms, pentagons, and hexagons.

Other embodiments comprise replicas of the master tool including multigenerational tooling and retroreflective sheeting. The retroreflective sheeting may be derived from the laminae or have the same optical features described with reference to a lamina. Retroreflective sheeting may have cube corner elements, cube corner cavities, or combinations thereof.

Hence, other embodiments include retroreflective sheeting comprising a row of preferred geometry cube corner elements having faces defined by grooves wherein adjacent side grooves range from being nominally parallel to nonparallel by less than 1° and have included angles that differ by at least 2°. In other embodiments, the retroreflective sheeting comprises a row of cube corner elements wherein a first cube corner element is canted having an alignment angle between 45° and 135° and a second adjacent cube is canted having an alignment angles between 225° and 315°. In yet other embodiments, the retroreflective sheeting comprises a row of preferred geometry cube corner elements having faces defined by a side groove set wherein at least two grooves within the set are nonparallel by amounts ranging from greater than nominally parallel to about 1°. In each of these embodiments, the sheeting preferably further comprises the features described with reference to the lamina or laminae.

In another aspect, retroreflective sheeting comprises a pair of adjacent rows of preferred geometry cube corner elements wherein adjacent elements in a row have at least one dihedral edge that ranges from being nominally parallel to nonparallel by less than 1° and wherein the pair of rows comprise at least two types of matched pairs.

In preferred embodiments, the retroreflective sheeting disclosed has improved properties. In one embodiment, the retroreflective sheeting exhibits a uniformity index of at least 1. Such uniformity can be obtained without tiling in more than one orientation. The uniformity index is preferably at least 3 and more preferably at least 5. In other preferred embodiments, the retroreflective sheeting comprises an array of preferred geometry cube corner elements that exhibits an average brightness at 0° and 90° orientation according to ASTM D4596-1a of at least 375 candelas/lux/m$^2$ for an entrance angle of −4° and an observation angle of 0.5°. Preferably, the sheeting exhibits improved brightness at other observation angles as well.

The application further discloses any combination of features described herein.

BRIEF DESCRIPTION OF THE DRAWINGS

FIG. 26 depicts a spot diagram for cubes that are backward canted by 7.47 degrees with a combination of primary groove and side groove angle errors.

FIG. 27 depicts a spot diagram for cubes that are backward canted by 7.47 degrees wherein the side grooves comprise a constant skew of 7 arc minutes, a side groove angle error of +1.5 arc minutes and inclination varied in a repeating pattern over every four grooves.

Figure 1:
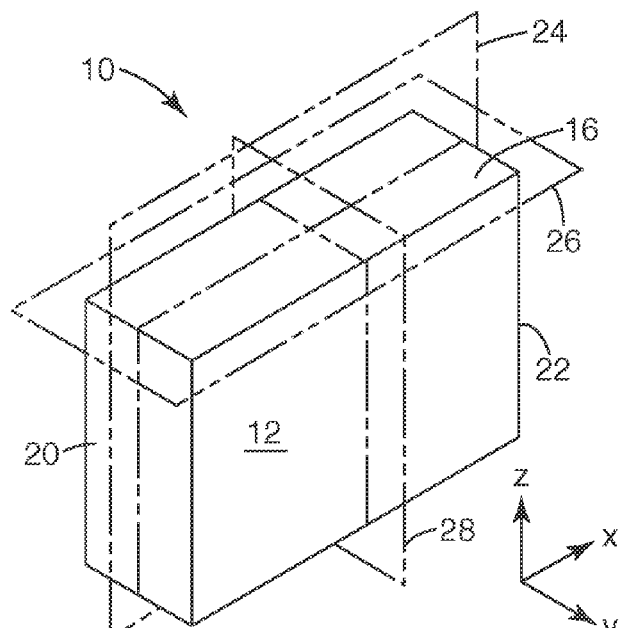
FIG. 1 is a perspective view of an exemplary single lamina prior to formation of cube corner elements.
Figure 2:
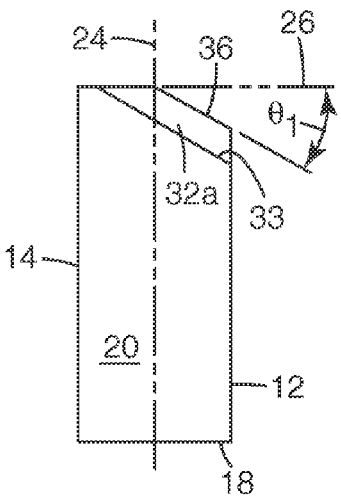
FIG. 2 is an end view of an exemplary single lamina following the formation of a first groove set.
Figure 3:
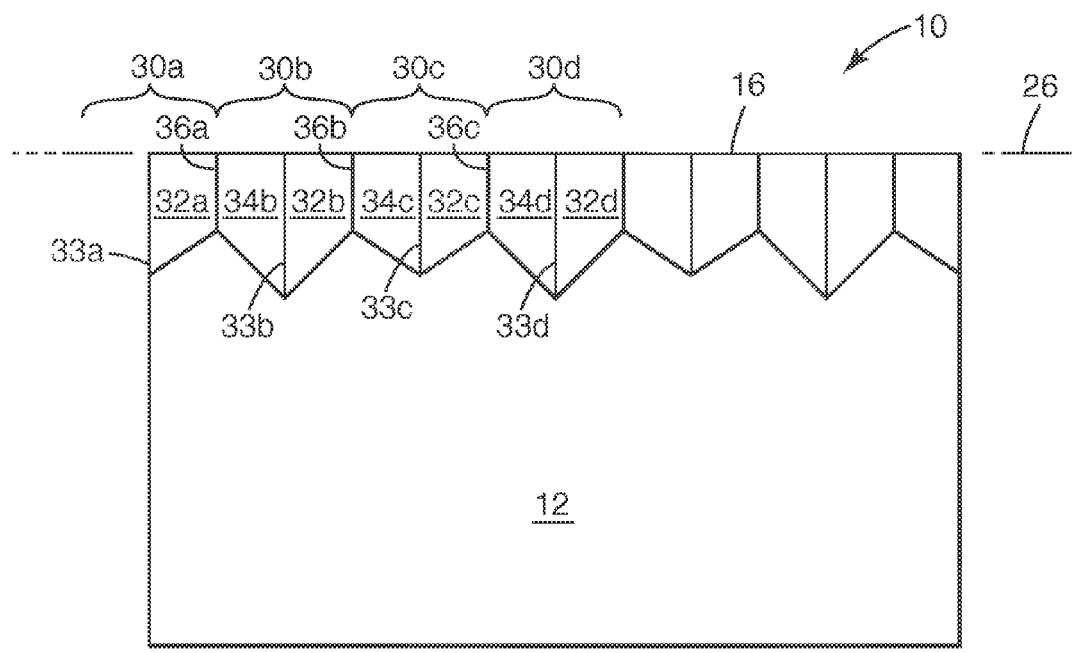
FIG. 3 is a side view of an exemplary single lamina following the formation of a first groove set.

The drawings, particularly of the lamina(e), are illustrative and thus not necessary representative of actual size. For example the drawing(s) may be an enlarged lamina or enlarged portion of a lamina.

DETAILED DESCRIPTION OF THE PREFERRED EMBODIMENTS

The present disclosure relates to a lamina and laminae comprising cube corner elements, a tool comprising an assembly of laminae and replicas. The disclosure further relates to retroreflective sheeting.

The retroreflective sheeting is preferably prepared from a master mold manufactured with a technique that employs laminae. Accordingly, at least a portion and preferably substantially all the cube corner elements of the lamina(e) and retroreflective sheeting are full cubes that are not truncated. In one aspect, the base of full cube elements in plan view are not triangular. In another aspect, the non-dihedral edges of full cube elements are characteristically not all in the same plane (i.e., not coplanar). Such cube corner elements are preferably "preferred geometry (PG) cube corner elements".

A PG cube corner element may be defined in the context of a structured surface of cube corner elements that extends along a reference plane. For the purposes of this application, a PG cube corner element means a cube corner element that has at least one non-dihedral edge that: (1) is nonparallel to the reference plane; and (2) is substantially parallel to an adjacent non-dihedral edge of a neighboring cube corner element. A cube corner element whose three reflective faces comprise rectangles (inclusive of squares), trapezoids or pentagons are examples of PG cube corner elements. "Reference plane" with respect to the definition of a PG cube corner element refers to a plane or other surface that approximates a plane in the vicinity of a group of adjacent cube corner elements or other geometric structures, the cube corner elements or geometric structures being disposed along the plane. In the case of a single lamina, the group of adjacent cube corner elements consists of a single row or pair of rows. In the case of assembled laminae, the group of adjacent cube corner elements includes the cube corner elements of a single lamina and the adjacent contacting laminae. In the case of sheeting, the group of adjacent cube corner elements generally covers an area that is discernible to the human eye (e.g., preferably at least 1 mm$^2$) and preferably the entire dimensions of the sheeting.

"Entrance angle" refers to the angle between the reference axis (i.e., the normal vector to the retroreflective sample) and the axis of the incident light.

"Orientation" refers to the angle through which the sample may be rotated about the reference axis from the initial zero degree orientation of a datum mark.

Lamina(e) refers to at least two lamina. "Lamina" refers to a thin plate having length and height at least about 10 times its thickness (preferably at least 100, 200, 300, 400, 500 times its thickness). The disclosure is not limited to any particular dimensions of lamina(e). In the case of lamina intended for use in the manufacture of retroreflective sheeting, optimal dimensions may be constrained by the optical requirements of the final design (e.g., cube corner structures). In general the lamina has a thickness of less than 0.25 inches (6.35 mm) and preferably less than 0.125 inches (3.175 mm). The thickness of the lamina is preferably less than about 0.020 inches (0.508 mm) and more preferably less than about 0.010 inches (0.254 mm). Typically, the thickness of the lamina is at least about 0.001 inches (0.0254 mm) and more preferably at least about 0.003 inches (0.0762 mm). The lamina ranges in length from about 1 inch (25.4 mm) to about 20 inches (50.8 cm) and is typically less than 6 inches (15.24 cm). The height of the lamina typically ranges from about 0.5 inches (12.7 mm) to about 3 inches (7.62 cm) and is more typically less than about 2 inches (5.08 cm).

With reference to FIGS. 1-8 lamina 10 includes a first major surface 12 and an opposing second major surface 14. Lamina 10 further includes a working surface 16 and an opposing bottom surface 18 extending between first major surface 12 and second major surface 14. Lamina 10 further includes a first end surface 20 and an opposing second end surface 22. In a preferred embodiment, lamina 10 is a right rectangular polyhedron wherein opposing surfaces are substantially parallel. However, it will be appreciated that opposing surfaces of lamina 10 need not be parallel.

Lamina 10 can be characterized in three-dimensional space by superimposing a Cartesian coordinate system onto its structure. A first reference plane 24 is centered between major surfaces 12 and 14. First reference plane 24, referred to as the x-z plane, has the y-axis as its normal vector. A second reference plane 26, referred to as the x-y plane, extends substantially coplanar with working surface 16 of lamina 10 and has the z-axis as its normal vector. A third reference plane 28, referred to as the y-z plane, is centered between first end surface 20 and second end surface 22 and has the x-axis as its normal vector. For the sake of clarity, various geometric attributes of the present disclosure will be described with reference to the Cartesian reference planes as set forth herein. However, it will be appreciated that such geometric attributes can be described using other coordinate systems or with reference to the structure of the lamina.

The lamina(e) of the present disclosure preferably comprise cube corner elements having faces formed from, and thus comprise, a first groove set, an optional second groove set, and preferably a third primary groove (e.g., primary groove face).

FIGS. 2-9 illustrate a structured surface comprising a plurality of cube corner elements in the working surface 16 of lamina 10. In general, a first groove set comprising at least two and preferably a plurality of grooves 30a, 30b, 30c, etc. (collectively referred to as 30) are formed in working surface 16 of lamina 10. The grooves 30 are formed such that the respective groove vertices 33 and the respective first reference edges 36 extend along an axis that intersects the first major surface 12 and the working surface 16 of lamina 10. Although working surface 16 of the lamina 10 may include a portion that remains unaltered (i.e., unstructured), it is preferred that working surface 16 is substantially free of unstructured surface portions.

The direction of a particular groove is defined by a vector aligned with the groove vertex. The groove direction vector may be defined by its components in the x, y and z directions, the x-axis being perpendicular to reference plane 28 and the y-axis being perpendicular to reference plane 24. For example, the groove direction for groove 30b is defined by a vector aligned with groove vertex 33b. It is important to note that groove vertices may appear parallel to each other in top plan view even though the grooves are not parallel (i.e., different z-direction component).

As used herein, the term "groove set" refers to grooves formed in working surface 16 of the lamina 10 that range from being nominally parallel to non-parallel to within 1° to the adjacent grooves in the groove set. As used herein "adjacent groove" refers to the closest groove that is nominally parallel or non-parallel to within 1°. Alternatively or in addition thereto, the grooves of a groove set may range from being nominally parallel to non-parallel to within 1° to particular reference planes as will subsequently be described. Accordingly, each characteristic with regard to an individual groove and/or the grooves of a groove set (e.g., perpendicular, angle, etc.) will be understood to have this same degree of potential deviation. Nominally parallel grooves are grooves wherein no purposeful variation has been introduced within the degree of precision of the groove-forming machine. The grooves of the groove set may also comprise small purposeful variations for the purpose of introducing multiple non-orthogonality (MNO) such as included angle errors, and/or skew, and/or inclination as will subsequently be described in greater detail.

Referring to FIGS. 3-9, the first groove set comprises grooves 30a, 30b, 30c, etc. (collectively referred to by the reference numeral 30) that define first groove surfaces 32a, 32b, 32c, etc. (collectively referred to as 32) and second groove surfaces 34b, 34c, 34d, etc. (collectively referred to as 34) that intersect at groove vertices 33b, 33c, 33d, etc. (collectively referred to as 33). At the edge of the lamina, the groove forming operation may form a single groove surface 32a.

Figure 4:
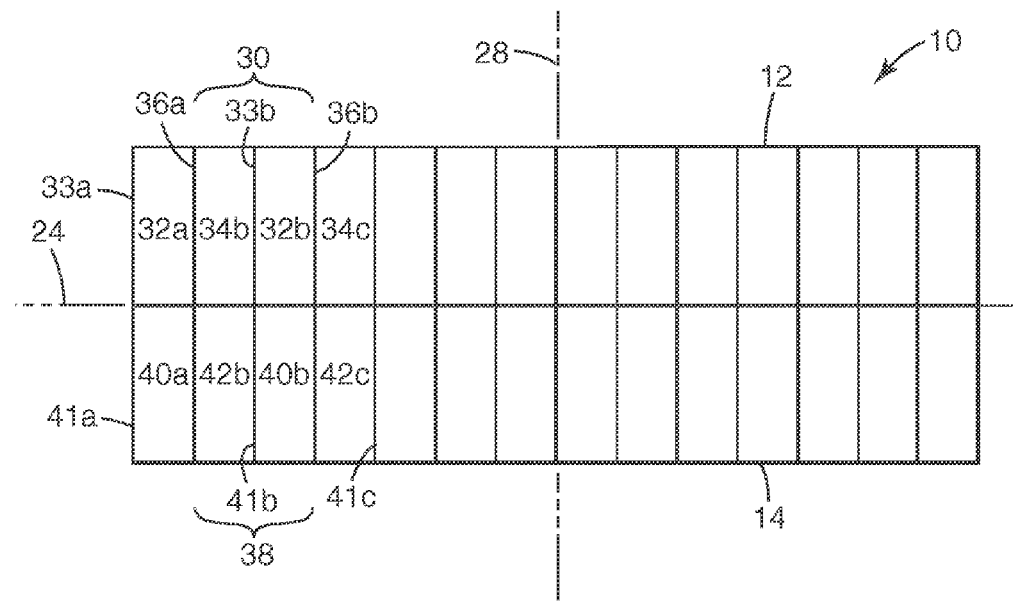
FIG. 4 is a top view of an exemplary single lamina following the formation of a first groove set and a second groove set.
Figure 5:
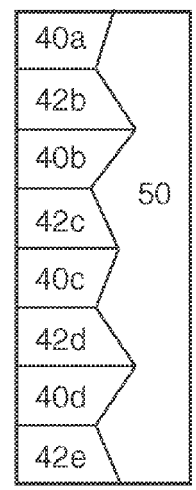
FIG. 5 is a top view of an exemplary single lamina following the formation of a first groove set and primary groove face.

In another embodiment depicted in FIG. 4, lamina 10 may optionally further comprise a second groove set comprising at least two and preferably a plurality of adjacent grooves, collectively referred to as 38) also formed in the working surface 16 of lamina 10. In this embodiment, the first and second groove sets intersect approximately along a first reference plane 24 to form a structured surface including a plurality of alternating peaks and v-shaped valleys. Alternatively, the peaks and v-shaped valleys can be off-set with respect to each other. Grooves 38 define third groove surfaces 40a, 40b, etc. (collectively referred to as 40) and fourth groove surfaces 42b, 42c, etc. (collectively referred to as 42) that intersect at groove vertices 41b, 41c, etc. (collectively referred to as 41) as shown. At the edge of the lamina, the groove forming operation may form a single groove surface 40a.

Both these first and second groove sets may also be referred to herein as "side grooves". As used herein side grooves refer to a groove set wherein the groove(s) range from being nominally parallel to non-parallel to within 1°, per their respective direction vectors, to the adjacent side grooves of the side groove set. Alternatively or in addition thereto, side grooves refers to a groove that range from being nominally parallel to reference plane 28 to nonparallel to reference plane 28 to within 1°. Side grooves are typically perpendicular to reference plane 24 to this same degree of deviation in plan view. Depending on whether the side grooves are nominally parallel or non-parallel within 1°, individual elements in the replicated assembled master typically have the shape of trapezoids, rectangles, parallelograms and pentagons, and hexagons when viewed in plan view with a microscope or by measuring the dihedral angles or parallelism of the side grooves with an interferometer. Suitable interferometers will subsequently be described.

Although the third face of the elements may comprise working surface 12 or 14, such as describe in EP 0 844 056 A1 (Mimura et al.), the lamina preferably comprises a primary groove face 50 that extends substantially the full length of the lamina. Regardless of whether the third face is a working surface (i.e., 12 or 14) of the lamina or a primary groove face, the third face of each element within a row preferably share a common plane. With reference to FIGS. 5-6 and 8-9, primary groove face 50 ranges from being nominally perpendicular to faces 32, 34, 40 and 42 to non-perpendicular to within 1°. Formation of primary groove face 50 results in a structured surface that includes a plurality of cube corner elements having three perpendicular or approximately perpendicular optical faces on the lamina. A single lamina may have a single primary groove face, a pair of groove faces on opposing sides and/or a primary groove along the intersection of working surface 16 with reference plane 24 that concurrently provides a pair of primary groove faces (e.g., FIG. 4). The primary groove is preferably parallel to reference plane 26 to within 1°.

Figure 6:
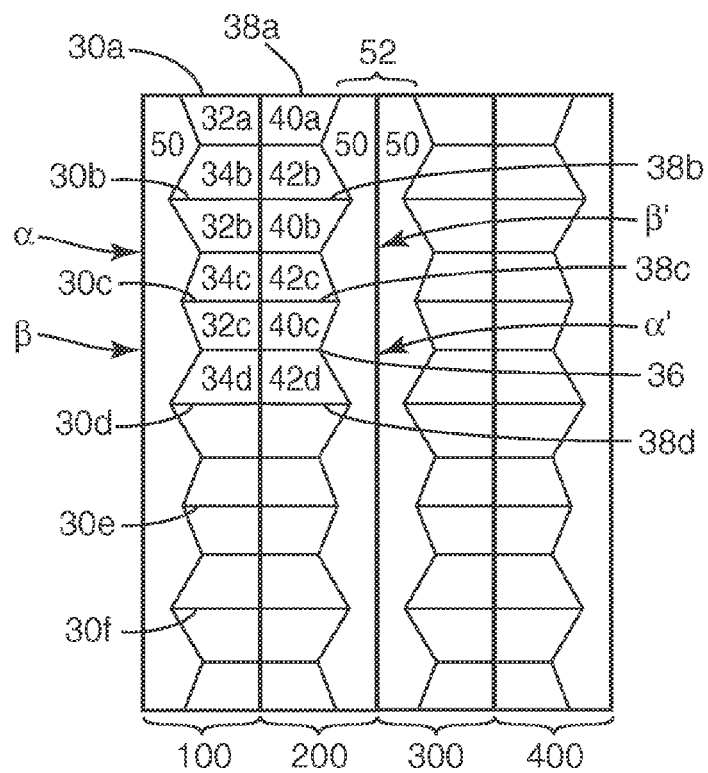
FIG. 6 is a top plan view of an exemplary assembly of four laminae comprising a first groove set and a third primary groove wherein the cube corners have been canted sideways.
Figure 7:
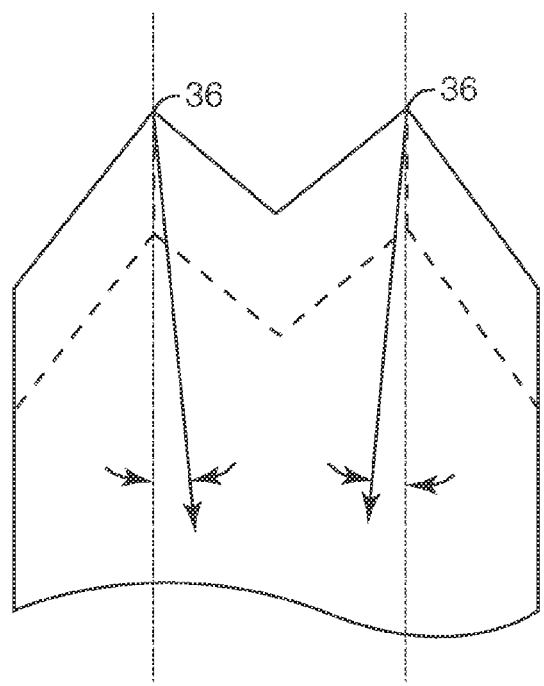
FIG. 7 is a side view depicting the symmetry axes of a pair of adjacent sideways canted cubes on a lamina.
Figure 8:
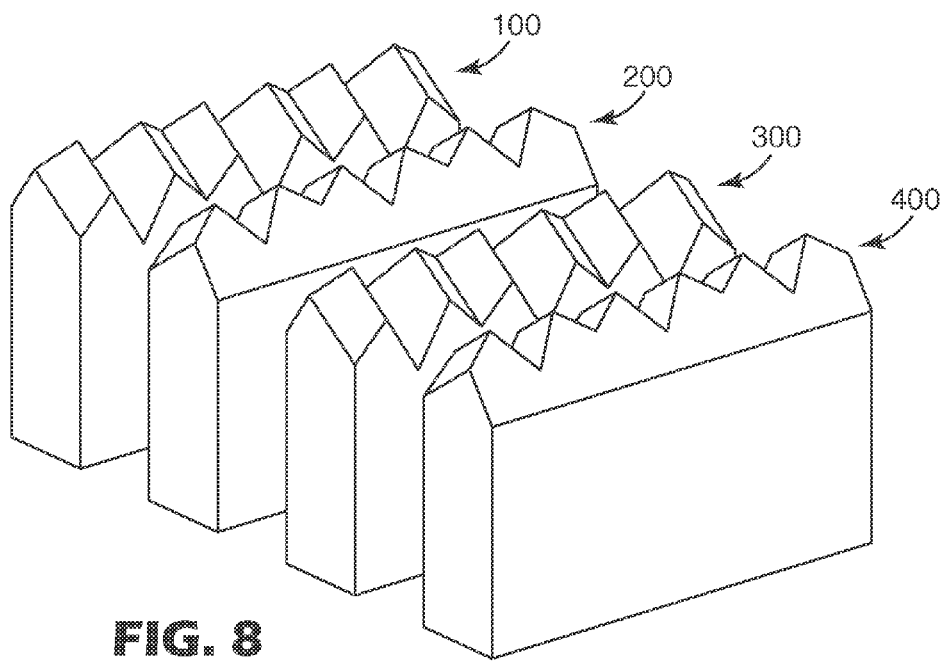
FIG. 8 is a perspective view of four laminae wherein the cube corners have been canted sideways.
Figure 9:
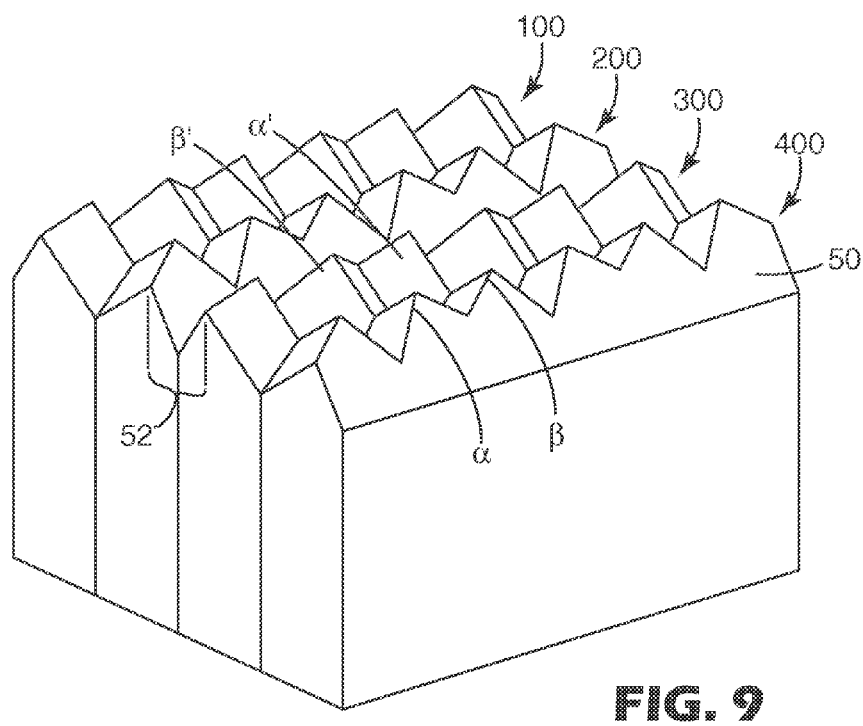
FIG. 9 is a perspective view of four laminae wherein the cube corners have been canted sideways and the laminae have been assembled in opposing orientations.

A pair of single laminae with opposing orientations and preferably multiple laminae with opposing orientations are typically assembled into a master tool such that their respective primary groove faces form a primary groove. For example, as depicted in FIGS. 6 and 8-9, four laminae (i.e., laminae 100, 200, 300 and 400 are preferably assembled such that every other pair of laminae are positioned in opposing orientations (i.e., the cube corner elements of lamina 100 are in opposing orientation with the cube corner elements of lamina 200 and the cube corner elements of lamina 300 are in opposing orientation with the cube corner elements of lamina 400). Further, the pairs of laminae having opposing orientation are positioned such that their respective primary groove faces 50 form primary groove 52. Preferably the opposing laminae are positioned in a configuration (e.g., 34b aligned with 42b) in order to minimize the formation of vertical walls.

After formation of the groove sets, working surface 16 is microstructured. As used herein, "microstructured" refers to at least one major surface of the sheeting comprising structures having a lateral dimension (e.g., distance between groove vertices of the cube corner structures) of less than 0.25 inches (6.35 mm), preferably less than 0.125 inches (3.175 mm) and more preferably less than 0.04 inches (1 mm). The lateral dimension of cube corner elements, is preferably less than 0.020 inches (0.508 mm) and more preferably less than 0.007 inches (0.1778 mm). Accordingly, the respective groove vertices 33 and 41 are preferably separated by this same distance throughout the groove other than the small variations resulting from non-parallel grooves. The microstructures have an average height ranging from about 0.001 inches (0.0254 mm) to 0.010 inches (0.254 mm), with a height of less than 0.004 inches (0.1016 mm) being most typical. Further, the lateral dimension of a cube corner microstructure is typically at least 0.0005 inches (0.0127 mm). Cube corner microstructures may comprise either cube corner cavities or, preferably, cube corner elements having peaks.

In one embodiment, as depicted in FIGS. 3-9, the present disclosure relates to a lamina and laminae comprising a side groove set wherein adjacent grooves comprise different included angles. "Included angle" refers to the angle formed between the two faces of a V-shaped groove that intersect at the groove vertex. The included angle is typically a function of the geometry of the diamond-cutting tool and its position relative to the direction of cut. Hence, a different diamond tool is typically employed for each different included angle. Alternatively, yet more time consuming, different included angles may be formed by making multiple cuts within the same groove. The included angles of a first groove (e.g., side groove) differs from an adjacent groove (e.g., second side groove) by at least 2° (e.g., 3°, 4°, 5°, 6°, 7°, 8°, 9°) preferably at least 10° (e.g., 11°, 12°, 13°, 14°), and more preferably by at least 15° (e.g., 16°, 17°, 18°, 19°, 20°). Accordingly, the difference in included angle is substantially larger than differences in included angles that would arise from purposeful angle errors introduced for the purpose of non-orthogonality. Further, the difference in included angles is typically less than 70° (e.g., 65°, 60°, 50°), preferably less than 55°, more preferably less than 50°, and even more preferably less than 40°.

In one aspect, the differing included angles (e.g., of adjacent side grooves) are arranged in a repeating pattern to minimize the number of different diamond cutting tools needed. In such embodiment, the sum of adjacent side groove angles is about 180°. In a preferred embodiment, the lamina comprises a first sub-set of side grooves having an included angle greater than 90° alternated with second sub-set of side grooves having an included angle less than 90°. In doing so, the included angle of a first groove is typically greater than 90° by an amount of at least about 5°, and preferably by an amount ranging from about 10° to about 20°; whereas the included angle of the adjacent groove is less than 90° by about the same amount.

Although, the lamina may further comprise more than two sub-sets and/or side grooves having included angles of nominally 90°, the lamina is preferably substantially free of side grooves having an included angle of nominally 90°. In a preferred embodiment, the lamina comprises an alternating pair of side grooves (e.g., 75.226° and) 104.774° and thus, only necessitates the use of two different diamonds to form the totality of side grooves. Accordingly, with reference to FIGS. 6-9, every other side grooves, i.e., 30a, 30c, 30e, etc. has an included angle of 75.226° alternated with the remaining side grooves, i.e., 30b, 30d, etc. having an included angle of 104.774°. As will subsequently be described in further detail, employing differing included angles in this manner improves the uniformity index.

In another aspect, alternatively or in combination with the differing included angles (e.g., of adjacent side grooves) being arranged in a repeating pattern, the resulting cube corner elements have faces that intersect at a common peak height, meaning that cube peaks (e.g., 36) are within the same plane to within 3-4 microns. It is surmised that a common peak height contribute to improved durability when handling the tooling or sheeting by evenly distributing the load.

Alternatively or in combination thereof, the lamina comprises sideways canted cube corner elements. For cube corner elements that are solely canted forward or backward, the symmetry axes are canted or tilted in a cant plane parallel with reference plane 28. The cant plane for a cube corner element is the plane that is both normal to reference plane 26 and contains the symmetry axis of the cube. Accordingly, the normal vector defining the cant plane has a y component of substantially zero for cube corner elements that are solely canted forward or backward. In the case of cube corner elements that are solely canted sideways, the symmetry axes of the cubes are canted in a plane that is substantially parallel to reference plane 24 and thus, the normal vector defining the cant plane has an x component of substantially zero.

Figure 10A:
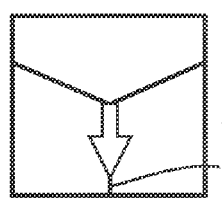
FIG. 10a is a representation of a backward canted cube corner element.
Figure 10B:
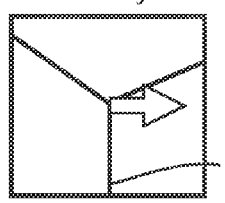
FIG. 10b is a representation of a sideways canted cube corner element.
Figure 10C:
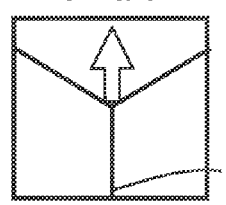
FIG. 10c is a representation of a forward canted cube corner element.

The projection of the symmetry axis in the x-y plane may alternatively be used to characterize the direction of cant. The symmetry axis is defined as the vector that trisects the three cube corner faces forming an equal angle with each of these three faces. FIGS. 10a-10c depict three different cube corner geometries in plan view that are solely backward canted, solely sideways canted, and solely forward canted, respectively. In these figures the cube peak extends out of the page and the projection of the symmetry axis (extending into the page from the cube peak) in the x-y plane is shown by the arrow. The alignment angle is measured counterclockwise in this view from the dihedral edge 11 (e.g., dihedral 2-3) that is approximately normal to a side of the cube in plan view. In the case of backward canting in the absence of sideways canting, the alignment angle is 0 degrees, whereas in the case of forward canting in the absence of sideways canting the alignment angle is 180 degrees. For a cube that has been canted sideways in the absence of forward or backward canting, the alignment angle is either 90° (as shown in FIG. 10b) or 270°. Alignment angle is 90° when the projection of the symmetry axis points to the right (FIG. 10b) and 270° when the projection of the symmetry axis points to the left.

Alternatively, the cube may be canted such that the cant plane normal vector comprises both an x-component and y-component (i.e., x-component and y-component are each not equal to zero). At an alignment angle between 0° and 45° or between 0° and 315° the backward cant component is predominant with the backward cant component and sideways cant component being equal at an alignment angle of 45° or 315°. Further at an alignment angle between 135° and 225°, the forward cant component is predominant with the forward cant component and sideways cant component being equal at 135° and at 225°. Accordingly, cant planes comprising a predominant sideways cant component have an alignment angle between 45° and 135° or between 225° and 315°. Hence, a cube corner element is predominantly sideways canting when the absolute value of the y-component of the cant plane normal vector is greater than the absolute value of the x-component of the cant plane normal vector.

For embodiments wherein the sideways canted cubes are formed from an alternating pair of side grooves having different included angle cubes where the cant plane is parallel to reference plane 24 the adjacent cubes within a given lamina (e.g., $\alpha$-$\beta$ or $\alpha'$-$\beta'$) are canted in the same or parallel planes. However, in general, if there is an x component to the cant plane normal vector, then adjacent cubes within a particular lamina are not canted in the same plane. Rather, the cube corner matched pairs are canted in the same or parallel planes (i.e., $\alpha$-$\alpha'$ or $\beta$-$\beta'$). Preferably, the cube corner elements of any given lamina have only two different alignment angles, e.g., derived from adjacent side grooves comprising different included angles. The alignment angle for the sideways canting example in FIG. 10b is 90°, corresponding to the $\beta$-$\beta'$ cubes in FIG. 6. Similarly, the alignment angle for the $\alpha$-$\alpha'$ sideways canted cubes in FIG. 6 is 270° (not shown).

Figure 11:
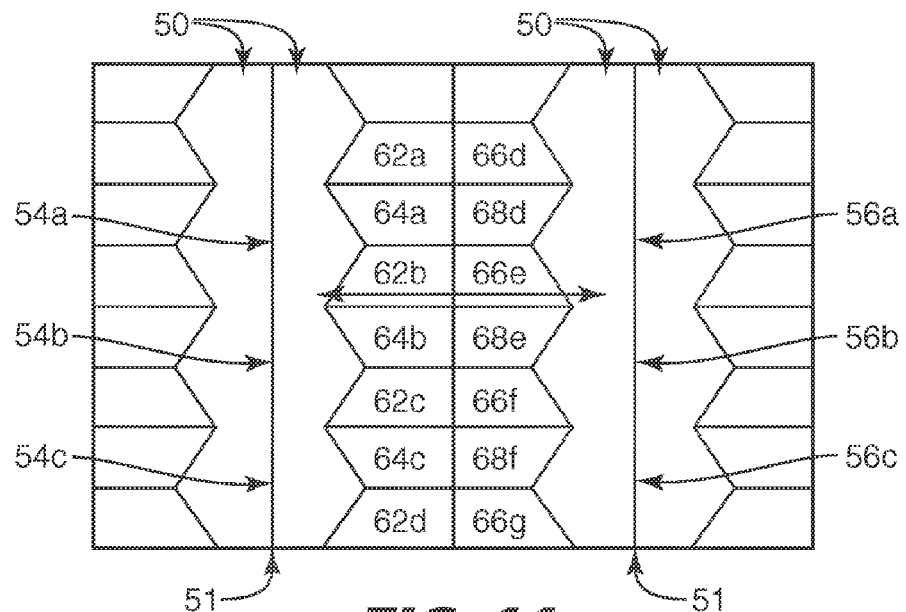
FIG. 11 depicts a top plan view of an assembly of laminae wherein the cube corners have been canted forward in a plane normal to the edge of the lamina.
Figure 12:
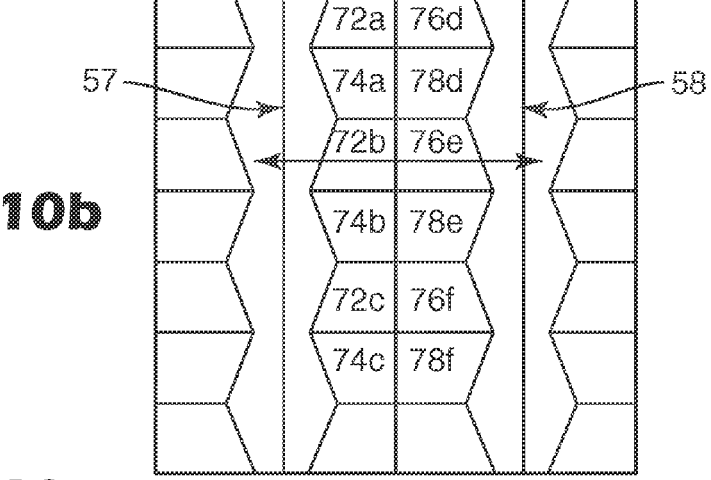
FIG. 12 depicts a top plan view of an assembly of laminae wherein the cube corners have been canted backward in a plane normal to the edge of the lamina.

FIG. 11 depicts laminae wherein the cubes are canted forward; whereas FIG. 12 depicts laminae wherein the cubes are canted backward. Cube designs canted in this manner result in a single type of matched opposing cube pairs. The cube 54a of FIG. 11 with faces 64a and 62b is the same as the cube 54b with faces 64b and 62c that is the same as cube 54c with faces 64c and 62d, etc. Accordingly, all the cubes within the same row are the same, the row being parallel to reference plane 24. The cube 54a is a matched opposing pair with cube 56a having faces 66e and 68d. Further, the cube 54b is a matched opposing pair with cube 56b. Likewise, cube 54c is a matched opposing pair with cube 56c. Similarly, cube 57 of FIG. 12 is a matched opposing pair with cube 58. Matched pairs result when 180° rotation of a first cube about an axis normal to the plane of the structured surface will result in a cube that is super-imposable onto a second cube. Matched pairs need not necessarily be directly adjacent or contacting within the group of cube corner elements. Matched pairs typically provide retroreflective performance that is symmetric with respect to positive or negative changes in entrance angle for opposing orientations.

In contrast, sideways canting results in a cube design comprising two different cube orientations within the same row and thus created by the same side groove set. For a single lamina comprising both the first and second set of side grooves or a pair of adjacent laminae assembled in opposing orientations, the laminae comprise four distinctly different cubes and two different matched pairs, as depicted in FIGS. 6, 8-9. The four distinctly different cubes are identified as cubes alpha ($\alpha$) having faces 32b and 34c, beta ($\beta$) having faces 32c and 34d, alpha prime ($\alpha$) having faces 40c and 42d, and beta prime ($\beta'$) having faces 40b and 42c. Cubes ($\alpha$, $\alpha'$) are a matched pair with the same geometry when rotated 180° such that the cube faces are parallel, as are cubes ($\beta$, $\beta'$). Further, the cubes on adjacent laminae (e.g., 100, 200) are configured in opposing orientations. Although the symmetry axis of the cubes is tipped sideways, the bisector plane of the side grooves (i.e., the plane that divides the groove into two equal parts) preferably ranges from being nominally parallel to the bisector plane of an adjacent side groove (i.e., mutually parallel) to being nonparallel within 1°. Further, each bisector plane ranges from being nominally parallel to reference plane 28 to being nonparallel to reference plane 28 within 1°.

Figure 13:
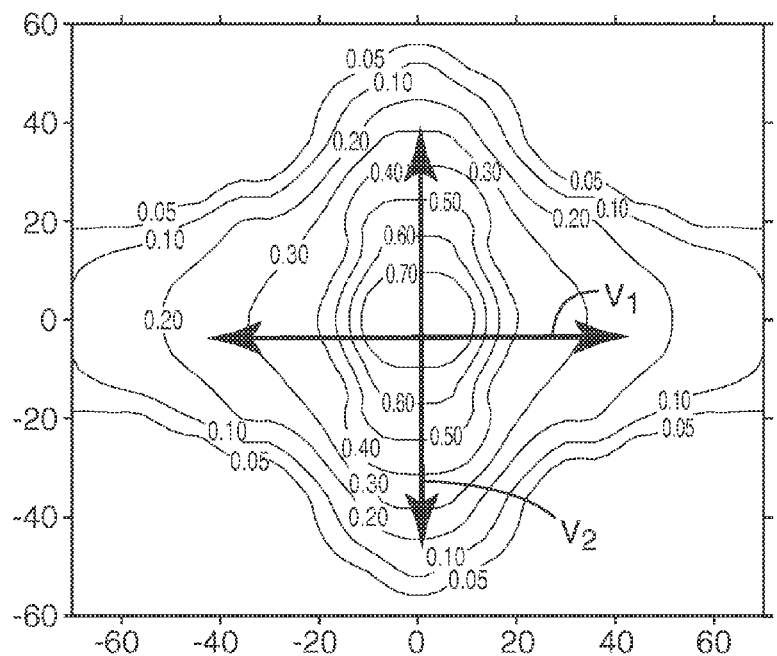
FIG. 13 depicts an isointensity plot showing the predicted light return contours for a matched pair of cube corner elements comprised of polycarbonate that have been canted forward 9.74°.
Figure 14:
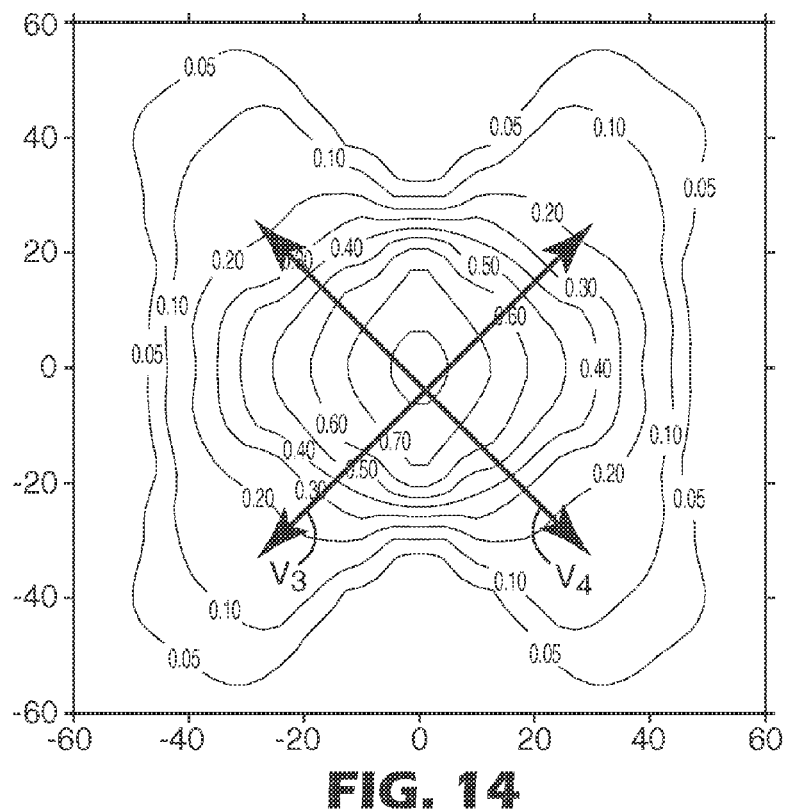
FIG. 14 depicts an isointensity plot showing the predicted light return contours for a matched pair of cube corner elements comprised of polycarbonate that have been canted backward 7.74°.
Figure 15:
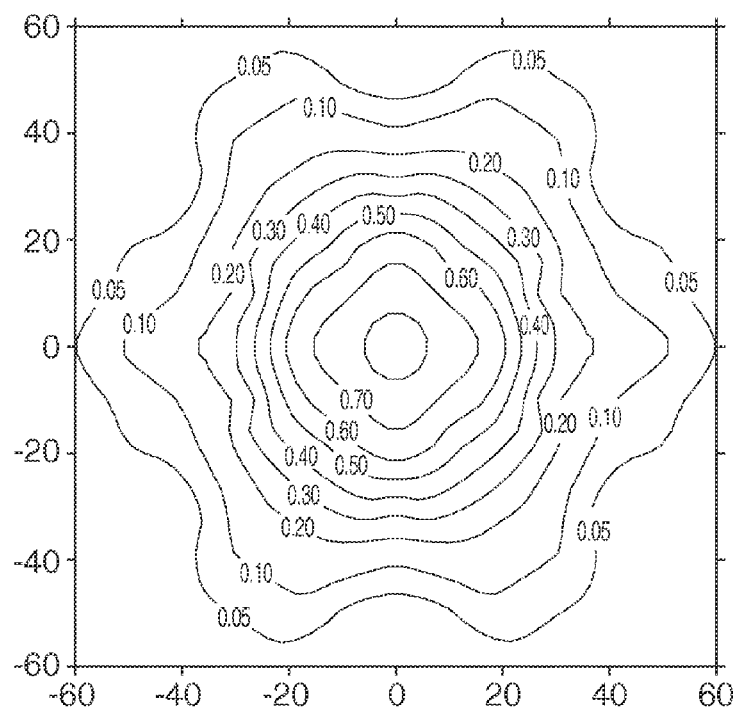
FIG. 15 depicts an isointensity plot showing the predicted light return contours for two opposing laminae that comprise polycarbonate cubes that have been canted sideways 4.41°.
Figure 16:
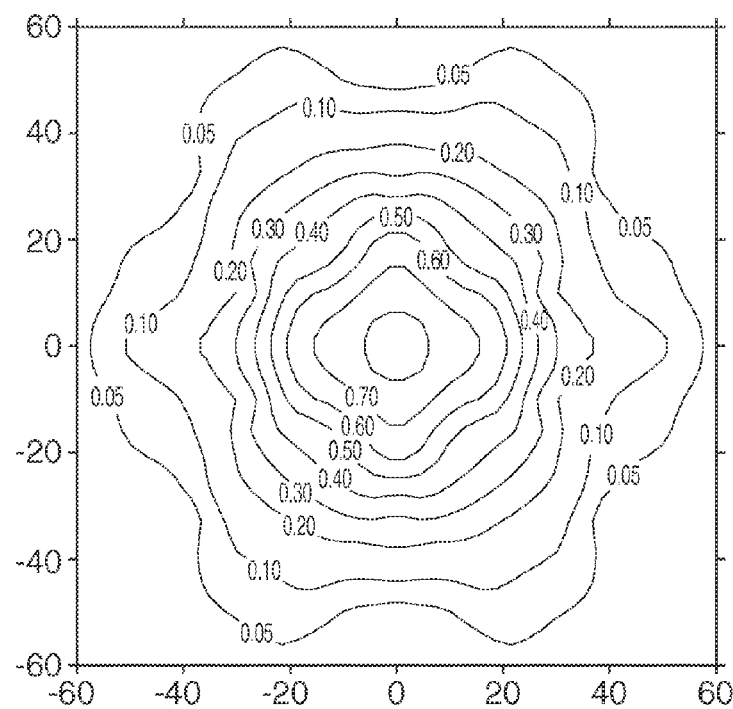
FIG. 16 depicts an isointensity plot showing the predicted light return contours for two opposing laminae that comprise polycarbonate cubes that have been canted sideways 5.23°.
Figure 17:
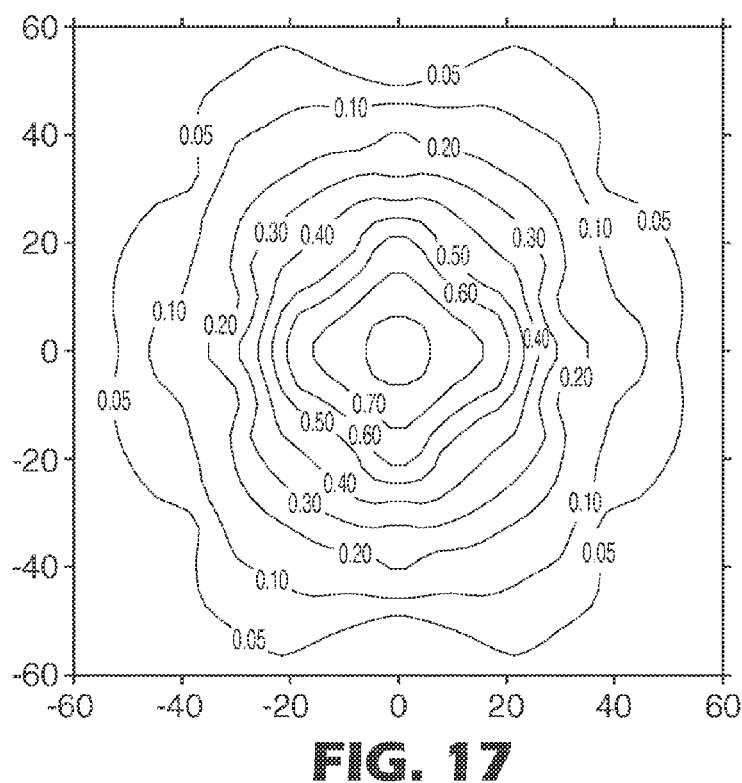
FIG. 17 depicts an isointensity plot showing the predicted light return contours for two opposing laminae that comprises polycarbonate cubes that have been canted sideways 6.03°.
Figure 18:
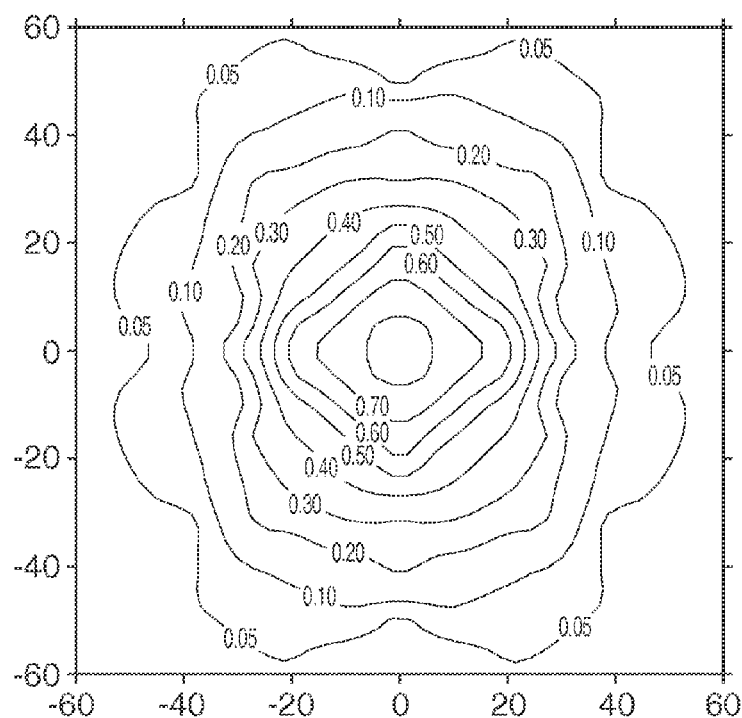
FIG. 18 depicts an isointensity plot showing the predicted light return contours for two opposing laminae that comprise polycarbonate cubes that have been canted sideways 7.33°.
Figure 19:
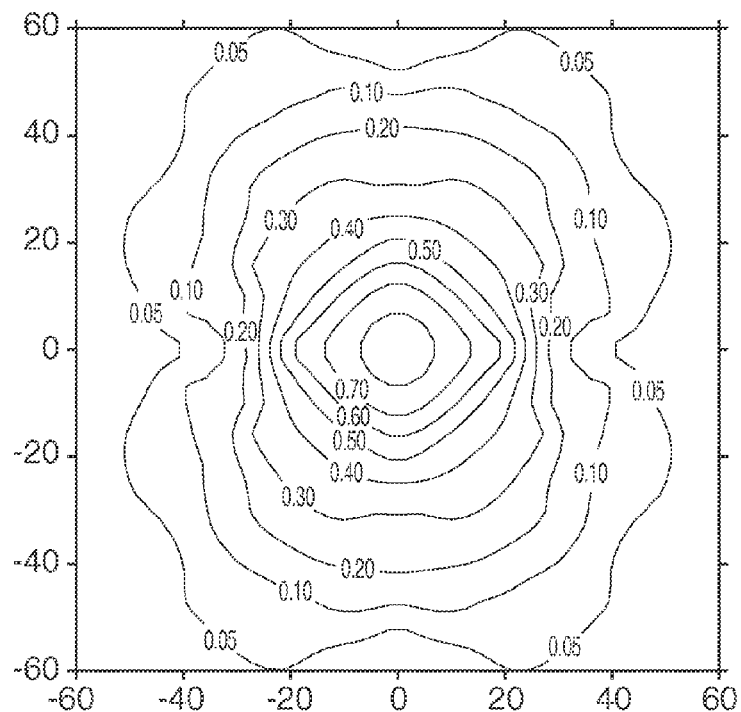
FIG. 19 depicts an isointensity plot showing the predicted light return contours for an assembly of laminae that comprises polycarbonate cubes that have been canted sideways 9.74°.

FIGS. 13-14 are isobrightness contour graphs illustrating the predicted total light return for a retroreflective cube corner element matched pair formed from a material having an index of refraction of 1.59 at varying entrance angles and orientation angles. In FIG. 13 the matched pair is forward canted 9.74° (e.g., cube corner elements 54, 56 of FIG. 11). In FIG. 14, the matched pair is backward canted 7.47° (e.g., cube corner elements 57, 58 of FIG. 12). FIGS. 15-19 are isobrightness contour graph illustrating the predicted total light return for laminae comprising retroreflective cube corner elements formed from a material having an index of refraction of 1.59 at varying entrance angles and orientation angles where the cube corner elements are canted sideways 4.41°, 5.23°, 6.03°, 7.33°, and 9.74°, respectively for alignment angles of 90° and 270°. An alternating pair of side grooves (i.e., 75.226° and 104.774°) is utilized for FIG. 17 to produce cube corner elements that are sideways canted by 6.03°. The sideways canted arrays have two types of matched pairs, the β-β' and α-α' as depicted in FIG. 6. These matched pairs have alignment angles of 90° and 270° respectively. In each of FIGS. 15-19, the isobrightness contour graph is for laminae having the same (i.e., vertical) orientation as depicted in FIGS. 6, 11 and 12.

Predicted total light return for a cube corner matched pair array may be calculated from a knowledge of percent active area and ray intensity. Total light return is defined as the product of percent active area and ray intensity. Total light return for directly machined cube corner arrays is described by Stamm U.S. Pat. No. 3,712,706.

For an initial unitary light ray intensity, losses may result from two pass transmissions through the front surface of the sheeting and from reflection losses at each of the three cube surfaces. Front surface transmission losses for near normal incidence and a sheeting refractive index of about 1.59 are roughly 0.10 (roughly 0.90 transmission). Reflection losses for cubes that have been reflectively coated depend for example on the type of coating and the angle of incidence relative to the cube surface normal. Typical reflection coefficients for aluminum reflectively coated cube surfaces are roughly 0.85 to 0.9 at each of the cube surfaces. Reflection losses for cubes that rely on total internal reflection are essentially zero (essentially 100% reflection). However, if the angle of incidence of a light ray relative to the cube surface normal is less than the critical angle, then total internal reflection can break down and a significant amount of light may pass through the cube surface. Critical angle is a function of the refractive index of the cube material and of the index of the material behind the cube (typically air). Standard optics texts such as Hecht, "Optics", 2nd edition, Addison Wesley, 1987 explain front surface transmission losses and total internal reflection. Effective area for a single or individual cube corner element may be determined by, and is equal to, the topological intersection of the projection of the three cube corner surfaces on a plane normal to the refracted incident ray with the projection of the image surfaces of the third reflection on the same plane. One procedure for determining effective aperture is discussed for example by Eckhardt, Applied Optics, v. 10, n. 7, July 1971, pg. 1559-1566. Straubel U.S. Pat. No. 835,648 also discusses the concept of effective area or aperture. Percent active area for a single cube corner element is then defined as the effective area divided by the total area of the projection of the cube corner surfaces. Percent active area may be calculated using optical modeling techniques known to those of ordinary skill in the optical arts or may be determined numerically using conventional ray tracing techniques. Percent active area for a cube corner matched pair array may be calculated by averaging the percent active area of the two individual cube corner elements in the matched pair. Alternatively stated, percent active aperture equals the area of a cube corner array that is retroreflecting light divided by the total area of the array. Percent active area is affected for example by cube geometry, refractive index, angle of incidence, and sheeting orientation.

Referring to FIG. 13 vector $V_1$ represents the plane that is normal to reference plane 26 and includes the symmetry axes of cube corner elements 54, 56 in FIG. 11. For example, $V_1$ lies in a plane substantially normal to the primary groove vertex 51 formed by the intersection of the primary groove faces 50. The concentric isobrightness curves represent the predicted total light return of the array of cube corner elements 54, 56 at various combinations of entrance angles and orientation angles. Radial movement from the center of the plot represents increasing entrance angles, while circumferential movement represents changing the orientation of the cube corner element with respect to the light source. The innermost isobrightness curve demarcates the set of entrance angles at which a matched pair of cube corner elements 54, 56 exhibit 70% total light return. Successively outlying isobrightness curves demarcate entrance and orientation angles with successively lower percentages.

A single matched pair of forward or backward canted cubes typically have two planes (i.e., $V_1$ and $V_2$) of broad entrance angularity that are substantially perpendicular to one another. Forward canting results in the principle planes of entrance angularity being horizontal and vertical as shown in FIG. 13. The amount of light returned at higher entrance angles varies considerably with orientation and is particularly low between the planes of best entrance angularity. Similarly, backward canting results in the principle planes of entrance angularity (i.e., $V_3$ and $V_4$) oriented at roughly 45° to the edge of the lamina as shown in FIG. 14. Similarly, the amount of light returned at higher entrance angles varies considerably with orientation and is particularly low between the planes of best entrance angularity.

FIGS. 15-19 depict the predicted total light return (TLR) isointensity contours for a pair of opposing laminae having sideways canted cubes. The light return is more uniform as indicated by the shape of the plot approaching circular, in comparison to the isointensity plots of forward and backward canted cubes of FIGS. 13 and 14. FIGS. 15-19 depict substantially higher light return at the locations of low light return evident in FIGS. 13 and 14. Accordingly, good retention of TLR at higher entrance angles (up to at least 45° entrance) is predicted. This improved orientation performance is desirable for signing products since the signs are commonly positioned at orientations of 0°, 45° and 90°. Prior to the present disclosure, a common method for improving the uniformity of total light return with respect to orientation has been tiling, i.e., placing a multiplicity of small tooling sections in more than one orientation, such as described for example in U.S. Pat. No. 5,936,770. Sideways canted cube corner arrays can improve the uniformity of total light return, without the need for tiling and thus the array is substantially free of tiling in more than one orientation.

In order to compare the uniformity of total light return (TLR) of various optical designs, the average TLR at orientations of 0°, 45° and 90° may be divided by the range of TLR at orientations of 0°, 45° and 90°, i.e., the difference between the maximum and minimum TLR at these angles, all at a fixed entrance angle. The entrance angle is preferably at least 30° or greater, and more preferably 40° or greater. Preferred designs exhibit the maximum ratio of average TLR relative to TLR range. This ratio, i.e., "uniformity index (UI)" was calculated for a 40° entrance angle for the forward and backward canted cubes of FIGS. 13 and 14, respectively as well as for the sideways canted cubes having various degrees of tilt of FIGS. 15-19. For Table 1 the spacing of the side grooves is equal to the thickness of the lamina (i.e., aspect ratio=1). The calculated uniformity index is summarized in Table 1 as follows:

TABLE 1

|  | Forward | Backward | Sideways (alignment angle = 90° C.) | | | | |
|---|---|---|---|---|---|---|---|
| Amount of cant (arc minutes) | 9.74 | 7.47 | 4.41 | 5.23 | 6.03 | 7.33 | 9.74 |
| Avg. TLR (0/45/90) | 0.210 | 0.133 | 0.160 | 0.184 | 0.209 | 0.180 | 0.166 |
| TLR Range (0/45/90) | 0.294 | 0.154 | 0.090 | 0.023 | 0.034 | 0.167 | 0.190 |
| UI | 0.71 | 0.87 | 1.79 | 8.02 | 6.23 | 1.08 | 0.88 |

Uniformity Index (UI)=Average TLR of 0°, 45°, 90°/ Range at 0°, 45° and 90°

Improved orientation uniformity results when the uniformity index is greater than 1. Preferably, the uniformity index is greater than 3 (e.g., 4), and more preferably greater than 5 (e.g., 6, 7, 8). Uniformity index will vary as a function of variables such as cube geometry (e.g., amount and type of cant, type of cube, cube shape in plan view, location of cube peak within aperture, cube dimensions), entrance angle, and refractive index.

Figure 20:
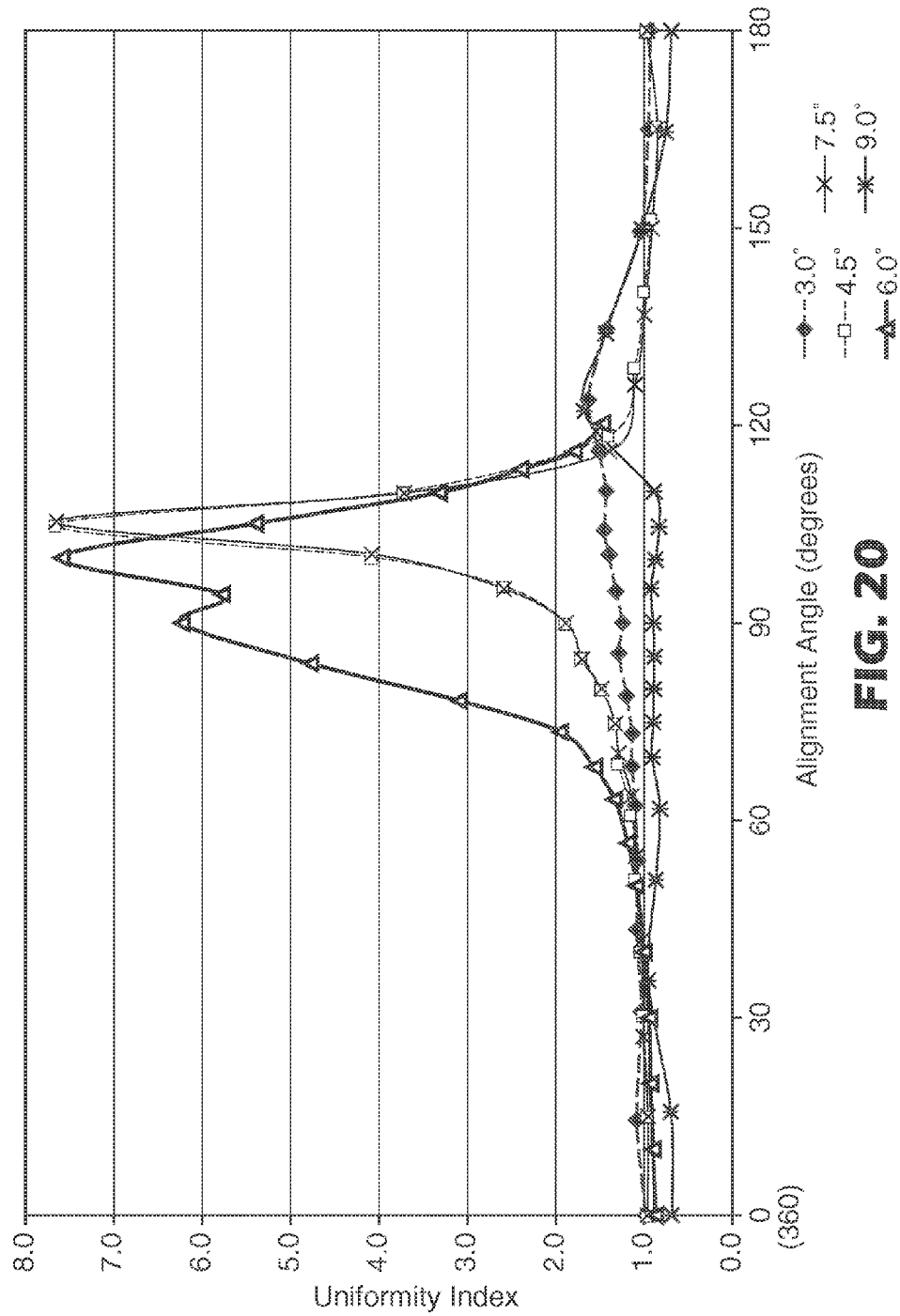
FIG. 20 is a plot of alignment angle versus uniformity index.

FIG. 20 illustrates the uniformity index plotted versus alignment angle for canted cube corner arrays with varying amounts of cant and varying x and y components for their cant plane normal vectors. The arrays have two types of matched pairs, similar to the β-β' and α-α' as depicted in FIG. 6, although these cubes and/or pairs may not be mutually adjacent. The cubes in each matched pair have substantially the same alignment angle. Alignment angles for the two types of matched pairs differ from 0° or 180° by the same amount. For example, for an alignment angle of 100° (differing from 180° by 80°) for a first cube or first matched pair the second (e.g., adjacent) cube or second matched pair would have an alignment angle of 260° (also differing from 180° by 80°).

FIG. 20 shows that the average TLR for polycarbonate (having an index of refraction of 1.59) as well as the uniformity index are maximized for cube geometries having a predominant sideways canting component, i.e., the range roughly centered about alignment angles of 90° and 270°. Note that alignment angles between 0° and 180° are presented on the X or horizontal axis of FIG. 20 from left to right. Alignment angles increasing from 180° to 360° degrees are plotted from right to left.

Preferably, the alignment angle is greater than 50° (e.g., 51°, 52°, 53°, 54°), more preferably greater than 55° (e.g., 56°, 57°, 58°, 59°), and even more preferably greater than 60°. Further the alignment angle is preferably less than 130° (e.g., 129°, 128°, 127°, 126°) and more preferably less than 125° (e.g., 124°, 123°, 122°, 121°), and even more preferably less than 120°. Likewise the alignment angle is preferably greater than 230° (e.g., 231°, 232°, 233°, 234°), and more preferably greater than 235° (e.g., 236°, 237°, 238°, 239°), and even more preferably greater than 240°. Further the alignment angle is preferably less than 310° (e.g., 309°, 308°, 307°, 306°) and more preferably less than 305° (e.g., 304°, 303°, 302°, 301°) and even more preferably less than 300°.

The amount of tilt of the cube symmetry axes relative to a vector perpendicular to the plane of the cubes is at least 2° and preferably greater than 3°. Further, the amount of tilt is preferably less than 9°. Accordingly, the most preferred amount of tilt ranges from about 3.5° to about 8.5° including any interval having end points selected from 3.6°, 3.7°, 3.8°, 3.9°, 4.0°, 4.1°, 4.2°, 4.3°, 4.4° and 4.5° combined with end points selected from 7.5°, 7.6°, 7.7°, 7.8°, 7.9°, 8.0°, 8.1°, 8.2°, 8.3° and 8.4°. Cube geometries that may be employed to produce these differing amounts of sideways cant are summarized in Table 2. The alignment angle may be 90° or 270° for each amount of cant.

TABLE 2

| Amount of Cant (°) | Side groove Sub-set 1 Half angle (°) | Side groove Sub-set 2 ½ angle (°) | Side groove Sub-set 1 Full angle (°) | Side groove Sub-set 2 Full angle (°) |
|---|---|---|---|---|
| 4.41 | 39.591 | 50.409 | 79.182 | 100.818 |
| 5.23 | 38.591 | 51.409 | 77.182 | 102.818 |
| 6.03 | 37.613 | 52.387 | 75.226 | 104.774 |
| 7.33 | 36.009 | 53.991 | 72.018 | 107.982 |
| 9.74 | 33.046 | 56.954 | 66.092 | 113.908 |

Although differing included angles alone or in combination with the previously described sideways canting provide improved brightness uniformity in TLR with respect to changes in orientation angle over a range of entrance angles, it is also preferred to improve the observation angularity or divergence profile of the sheeting. This involves improving the spread of the retroreflected light relative to the source (typically, vehicle headlights). As previously described retroreflected light from cube corners spreads due to effects such as diffraction (controlled by cube size), polarization (important in cubes which have not been coated with a specular reflector), and non-orthogonality (deviation of the cube corner dihedral angles from 90° by amounts less than 1°). Spread of light due to non-orthogonality is particularly important in (e.g., PG) cubes produced using laminae since relatively thin laminae would be required to fabricate cubes where the spreading of the return light was dominated by diffraction. Such thin laminae are particularly difficult to handle during fabrication.

Alternatively, or in addition to the features previously described, in another embodiment the present disclosure relates to an individual lamina, a master tool comprising the assembled laminae, as well as replicas thereof including retroreflective replicas, comprising side grooves wherein the side grooves comprise "skew" and/or "inclination". Skew and/or inclination provides cubes with a variety of controlled dihedral angle errors or multiple non-orthogonality (MNO) and thus improves the divergence profile of the finished product. As used herein "skew" refers to the deviation from parallel with reference to reference plane 28.

Figure 21:
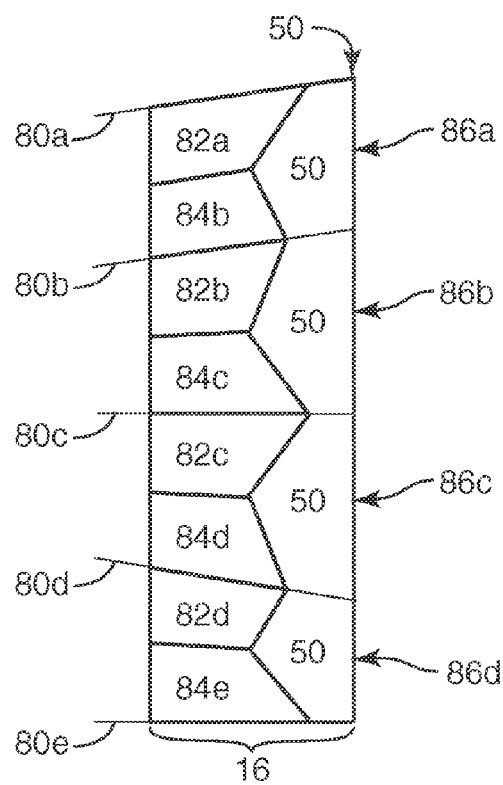
FIG. 21 depicts a top plan view of a lamina having skewed side grooves.
Figure 22:
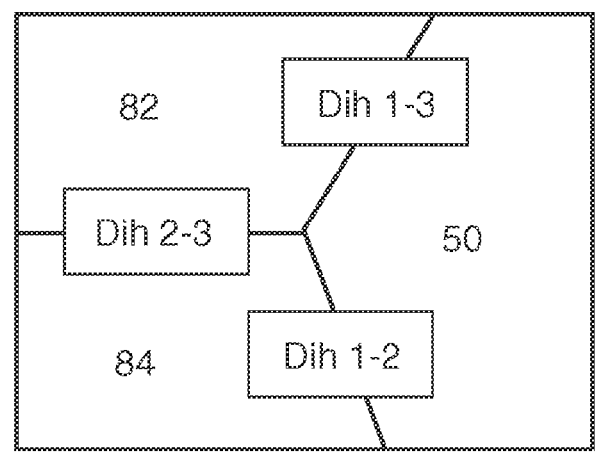
FIG. 22 depicts each of the dihedral angles of a representative cube corner element.
Figure 23:
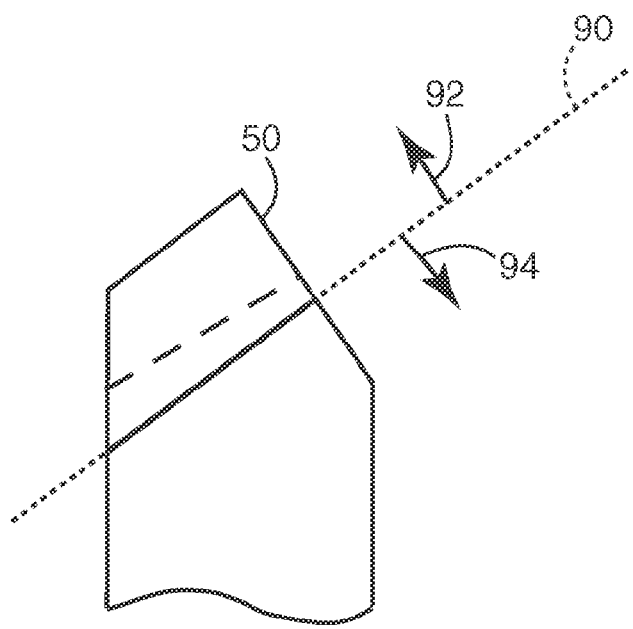
FIG. 23 depicts a side view of a cube corner element of a lamina depicting positive and negative inclination.

FIG. 21 shows an exaggerated example in plan view of a single lamina with one row of cube corner elements comprising skewed grooves. Side grooves 80a and 80b are cut with positive skew, grooves 80c and 80e without skew, and groove 80d with negative skew. The path of the side grooves 80 has been extended in FIG. 21 for clarity. Provided side grooves 80a, 80c, and 80e have the same included angle (e.g., 75°, first groove sub-set), the same cutting tool or diamond can be used to form all of these grooves. Further, if the alternating grooves, namely 80b and 80d have the same included angle (e.g., 105°, second groove sub-set) 80b and 80d can be cut with a second diamond. The primary groove face 50 may also be cut with one of these diamonds if the primary groove half angle is sufficiently close to the side groove half angle for the first or second sub-sets. Optionally, one of the cutting tools may be rotated during cutting of the primary groove face in order to achieve the correct primary groove half angle. The primary groove face is preferably aligned with the side of the lamina. Thus, the entire lamina can be cut incorporating MNO with the use of only two diamonds. Within each groove set skew can be easily varied during machining to produce a range of dihedral angles. Cube corners in general have three dihedral angles attributed to the intersections of the three cube faces. The deviation of these angles from 90° is commonly termed the dihedral angle error and may be designated by dihedral 1-2, dihedral 1-3, and dihedral 2-3. In one naming convention, as depicted in FIG. 22, cube dihedral angle 1-3 is formed by the intersection of groove surface 82 with primary groove face 50, cube dihedral 1-2 is formed by the intersection of groove surface 84 with primary groove face 50, and cube dihedral 2-3 is formed by the intersection of groove surface 84 with groove surface 82. Alternatively, the same naming convention may be employed wherein the third face is working surface 12 or 14 rather than a primary groove face. For a given groove, positive skew (80a, 80b) results in decreasing dihedral 1-3 and increasing dihedral 1-2 while negative skew results in increasing dihedral 1-3 and decreasing dihedral 1-2.

For example, with reference to FIG. 21 four different cubes are formed. The first cube 86a has groove surfaces (i.e., faces) 82a and 84b, the second cube 86b groove surfaces 82b and 84c, the third cube 86c groove surfaces 82c and 84d, and the fourth cube 86d has groove surfaces 82d and 84e. The intersection of groove surfaces 82a, 82b, and 84d with groove face 50 are less than 90°, whereas the intersection of groove surfaces 84b and 82d with groove face 50 are greater than 90°. The intersection of groove surfaces 82c, 84c, and 84e with groove face 50 are 90° since grooves 80c and 80e are without skew. The preceding discussion assumes that the inclination (as will subsequently be defined) is the same for all the side grooves in FIG. 21 and equals zero. The (e.g., PG) cube corner elements are trapezoids or parallelograms in plan view shape as a result of using skewed grooves during machining Alternatively, or in addition to the features previously described, the side grooves may comprise positive or negative inclination. "Inclination" refers to the deviation in slope in reference plane 28 of a particular side groove from the nominal orthogonal slope (i.e., the slope of the vector normal to the primary groove surface). The direction of a side groove is defined by a vector aligned with the vertex of said groove. Orthogonal slope is defined as the slope in which the vertex 90 of a groove would be parallel to the normal vector of groove face 50 (normal to groove face 50) for skew equal to zero. In one possible naming convention, positive inclination 92 results in decreasing both dihedral 1-3 and dihedral 1-2 for a given side groove while negative inclination 94 results in increasing both dihedral 1-3 and dihedral 1-2. Combining skew and/or inclination during machining provides significant flexibility in varying the dihedral angle errors of the cube corner elements on a given lamina. Such flexibility is independent of cant. Accordingly skew and/or inclination may be employed with uncanted cubes, forward canted cubes, backward canted cubes, as well as sideways canted cubes. The use of skew and/or inclination provides a distinct advantage as it can be introduced during the machining of individual lamina without changing the tool (e.g., diamond) used to cut the side grooves. This can significantly reduce machining time as it typically can take hours to correctly set angles after a tool change. Furthermore, dihedral 1-2 and dihedral 1-3 may be varied in opposition using skew and/or inclination. "Varied in opposition" as used herein is defined as intentionally providing within a given cube corner on a lamina dihedral 1-2 and 1-3 errors (differences from 90°) that differ in magnitude and/or sign. The difference in magnitude is typically at least ¼ arc minutes, more preferably at least ½ arc minutes, and most preferably at least 1 arc minutes. Hence the grooves are nonparallel by amount greater than nominally parallel. Further, the skew and/or inclination is such that the magnitude is no more than about 1° (i.e., 60 arc minutes). Further, the (e.g., side) grooves may comprise a variety of different components of skew and/or inclination along a single lamina.

Dihedral angle errors may also be varied by changing the half angles of the primary or side grooves during machining. Half angle for side grooves is defined as the acute angle formed by the groove face and a plane normal to reference plane 26 that contains the groove vertex. Half angle for primary grooves or groove faces is defined as the acute angle formed by the groove face and reference plane 24. Changing the half angle for the primary groove results in a change in slope of groove face 50 via rotation about the x-axis. Changing the half angle for a side groove may be accomplished via either changing the included angle of the groove (the angle formed by opposing groove faces, e.g., 82c and 84c) or by rotating a groove about its vertex. For example, changing the angle of the primary groove face 50 will either increase or decrease all of the dihedral 1-2 and dihedral 1-3 errors along a given lamina. This contrasts to changes in inclination where the dihedral 1-2 and dihedral 1-3 errors can be varied differently in each groove along a given lamina. Similarly, the half angle for the side grooves may vary, resulting in a corresponding change in dihedral 2-3. Note that for side grooves that are orthogonal or nearly orthogonal (within about 1°) to the primary groove face, dihedral 1-2 and dihedral 1-3 are very insensitive to changes in side groove half angle. As a result, varying the half angles of the primary or side grooves during machining will not allow dihedral 1-2 and dihedral 1-3 to vary in opposition within a given cube corner. Varying the half angles of the primary or side grooves during machining may be used in combination with skew and/or inclination to provide the broadest possible control over cube corner dihedral angle errors with a minimum number of tool changes. While the magnitude of any one of half angle errors, skew, or inclination can ranges up to about 1°, cumulatively for any given cube the resulting dihedral angle error is no more than about 1°.

For simplicity during fabrication, skew and/or inclination are preferably introduced such that the dihedral angle errors are arranged in patterns. Preferably, the pattern comprises dihedral angle errors 1-2 and 1-3 that are varied in opposition within a given cube corner.

Spot diagrams are one useful method based on geometric optics of illustrating the spread in the retroreflected light resulting from non-orthogonality from a cube corner array. Cube corners are known to split the incoming light ray into up to six distinct return spots associated with the six possible sequences for a ray to reflect from the three cube faces. The radial spread of the return spots from the source beam as well as the circumferential position about the source beam may be calculated once the three cube dihedral errors are defined (see e.g., Eckhardt, "Simple Model of Cube Corner Reflection", Applied Optics, V10, N7, July 1971). Radial spread of the return spots is related to observation angle while circumferential position of the return spots is related to presentation angle as further described in US Federal Test Method Standard 370 (Mar. 1, 1977). A non-orthogonal cube corner can be defined by the surface normal vectors of its three faces. Return spot positions are determined by sequentially tracking a ray as it strikes and reflects from each of the three cubes faces. If the refractive index of the cube material is greater than 1, then refraction in and out of the front surface cube must also be taken into account. Numerous authors have described the equations related to front surface reflection and refraction (e.g., Hecht and Zajac, "Optics", $2^{nd}$ edition, Addison Wesley 1987). Note that spot diagrams are based on geometric optics and hence neglect diffraction. Accordingly, cube size and shape is not considered in spot diagrams.

Figure 24:
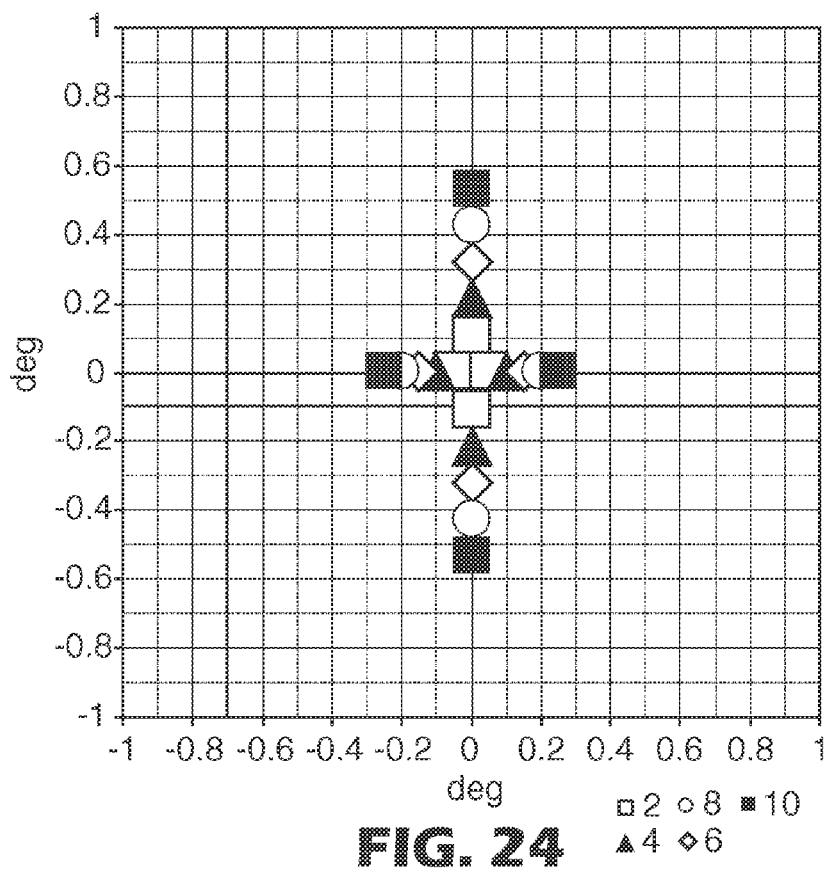
FIG. 24 depicts a spot diagram for cubes that are backward canted by 7.47 degrees with angle errors of the primary groove ranging from 2 to 10 arc minutes.

The return spot diagram for five different cubes that are backward canted by 7.47 degrees (e.g., FIG. 12) with errors in the primary groove half angle of five consecutive grooves of +2, +4, +6, +8, and +10 arc minutes is depicted in FIG. 24. The half angle errors for the side grooves are zero (dihedral 2-3=0) in this example, as are skew and inclination. All the side groove included angles are 90°. The vertical and horizontal axes in FIG. 24 correspond to reference planes 28 and 24, respectively. Note that changes in the slope of the primary groove face result in return spots located primarily along the vertical and horizontal axes.

The dihedral errors as a function of primary groove half angle errors are presented in Table 3 for the same errors used to produce FIG. 24. Note that dihedral 1-2 and dihedral 1-3 have the same magnitude and sign and thus, do not vary in opposition.

TABLE 3

| Primary Groove Error (arc minutes) | Dihedral 1-2 (arc minutes) | Dihedral 2-3 (arc minutes) | Dihedral 1-3 (arc minutes) |
|---|---|---|---|
| 2 | 1.4 | 0.0 | 1.4 |
| 4 | 2.8 | 0.0 | 2.8 |
| 6 | 4.2 | 0.0 | 4.2 |
| 8 | 5.7 | 0.0 | 5.7 |
| 10 | 7.1 | 0.0 | 7.1 |

Figure 25:
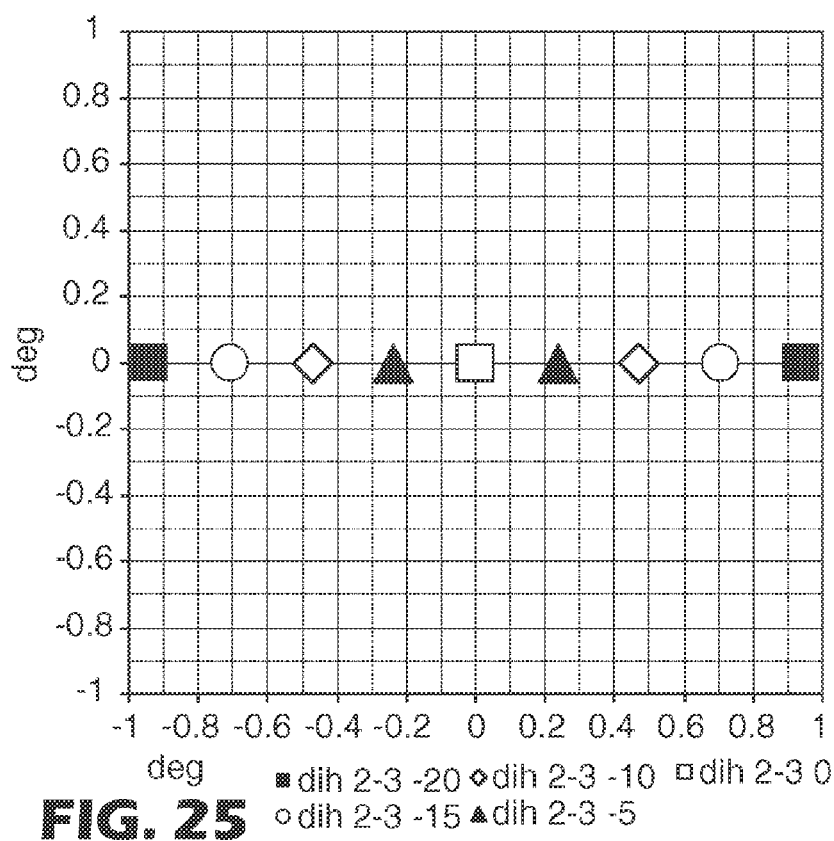
FIG. 25 depicts a spot diagram for cubes that are backward canted by 7.47 degrees with angle errors of the side grooves ranging from 0 to −20 arc minutes.

The return spot diagram for the same type of backward canted cubes with dihedral 2-3 errors of −20, −15, −10, −5, and 0 arc minutes is depicted in FIG. 25. The half angle errors for the primary groove are zero (dihedral 1-3=dihedral 1-2=0) in this example, as are skew and inclination. As stated previously, variations in the half angles for the side grooves may be used to produce the dihedral 2-3 errors. The dihedral 2-3 errors result in return spots located primarily along the horizontal axis.

FIG. 26 depicts a return spot diagram resulting from combining primary groove half angle errors with variations in the half angles for the side grooves for the same type of backward canted cubes as described with reference to FIGS. 24-25. In this example, the primary groove half angle error is 10 arc minutes while dihedral 2-3 error is 0, 2, 4, and 6 arc minutes respectively for four different adjacent cubes on the lamina. A constant included angle error of +3 arc minutes could be used to produce these side grooves, with the opposing half angle errors as shown in Table 4. The return spots are again located primarily along the vertical and horizontal axes, with some spreading in the horizontal plane due to the nonzero values for dihedral 2-3. Overall the return spot diagram is localized and non-uniform.

The dihedral errors as a function of primary groove half angle errors are presented in Table 4 for the errors used to produce FIG. 26. Note that dihedral 1-2 and dihedral 1-3 have the same magnitude and sign and hence do not vary in opposition (i.e., are substantially free of varying in opposition). Note that a given cube corner is formed by two adjacent side grooves and preferably a primary groove surface. The upper side groove in FIG. 22 forms dihedral 1-3 while the lower side groove forms dihedral 1-2. The intersection of the upper and lower side grooves forms dihedral 2-3. Side groove included angle is the sum of the upper and lower half angle errors for a groove that forms adjacent cubes (e.g., with reference to Table 4 the total included angle is +3 arc minutes and results from adding the upper half angle of a first cube with the lower half angle of the adjacent cube).

TABLE 4

| Cube No. | Dihedral 1-2 (arc minutes) | Dihedral 2-3 (arc minutes) | Dihedral 1-3 (arc minutes) | Lower Half Angle Error (arc minutes) | Upper Half Angle Error (arc minutes) |
|---|---|---|---|---|---|
| 1 | 7.1 | 4.0 | 7.1 | 3 | 1 |
| 2 | 7.1 | 6.0 | 7.1 | 2 | 4 |
| 3 | 7.1 | 2.0 | 7.1 | −1 | 3 |
| 4 | 7.1 | 0.0 | 7.1 | 0 | 0 |

The preceding examples (i.e., FIGS. 24-26) were for backward canted cubes with varying half angle errors. In an analogous manner, forward canted cubes can be shown to have qualitatively similar return spot diagrams, i.e., substantially non-uniform with spots localized especially along the horizontal and vertical axes. Dihedral 1-2 and dihedral 1-3 of forward canted cubes also will have the same magnitude and sign and thus are substantially free of varying in opposition. In consideration of the uses of cube corner retroreflective sheeting, it is apparent that localized, non-uniform spot diagrams (e.g., FIGS. 24-26) are generally undesirable. Sheeting may be placed on signs in a wide variety of orientations, both as the background color as well as in some cases as cut out letters. Furthermore, signs may typically be positioned on the right, on the left, or above the road. In the case of vehicles marked with retroreflective sheeting for conspicuity, the position of the vehicle relative to the viewer is constantly changing. Both the left and right headlights of a vehicle illuminate a retroreflective target, and the position of the driver is quite different with respect to these headlights (differing observation and presentation angles). Vehicles such as motorcycles, where the driver is directly above the headlight, are commonly used. Finally, all of the relevant angles defining the viewing geometry change with distance of the driver/observer to the retroreflective sheeting or target. All of these factors make it clear that a relatively uniform spread of return spots is highly desirable in retroreflective sheeting. Because of the flexibility to easily introduce a wide range of dihedral angle errors, including dihedral 1-2 and dihedral 1-3 that vary in opposition, skew and/or inclination may be utilized to provide a relatively uniform spot return diagram.

FIG. 27 presents a return spot diagram resulting from variations in only inclination on a single lamina with the same backward canted cubes used in FIGS. 24-26. Half angle errors for the side grooves are +1.5 arc minutes on each side (dihedral 2-3 and side groove angle error of +3 arc minutes) and primary groove error is zero. Skew is constant in this example at +7 arc minutes. Inclination is varied in a repeating pattern over every four grooves (i.e., two grooves +5 arc minutes, then two grooves −1 arc minute). The spot pattern is much more uniformly distributed both radially (observation) and circumferentially (presentation) in comparison with FIGS. 24-26.

The dihedral errors for this example of varying inclination are presented in Table 5. The order of machining of the inclinations (arc minutes) is −1, +5, +5, −1 in a repeating pattern. For example with reference to cube no. 1, the first side groove has an inclination of −1 and the second side groove has an inclination of +5. Note that dihedral 1-2 and dihedral 1-3 vary in opposition with different magnitudes (absolute value of the dihedral angle errors are unequal) and signs.

TABLE 5

| Cube No. | Inclination (arc minutes) | Dihedral 1-2 (arc minutes) | Dihedral 3-2 (arc minutes) | Dihedral 1-3 (arc minutes) |
| --- | --- | --- | --- | --- |
| 1 | −1, 5 | 5.1 | 3.0 | −7.9 |
| 2 | 5, 5 | 0.8 | 3.0 | −7.9 |
| 3 | 5, −1 | 0.8 | 3.0 | −3.7 |
| 4 | −1, −1 | 5.1 | 3.0 | −3.7 |

Figure 28:
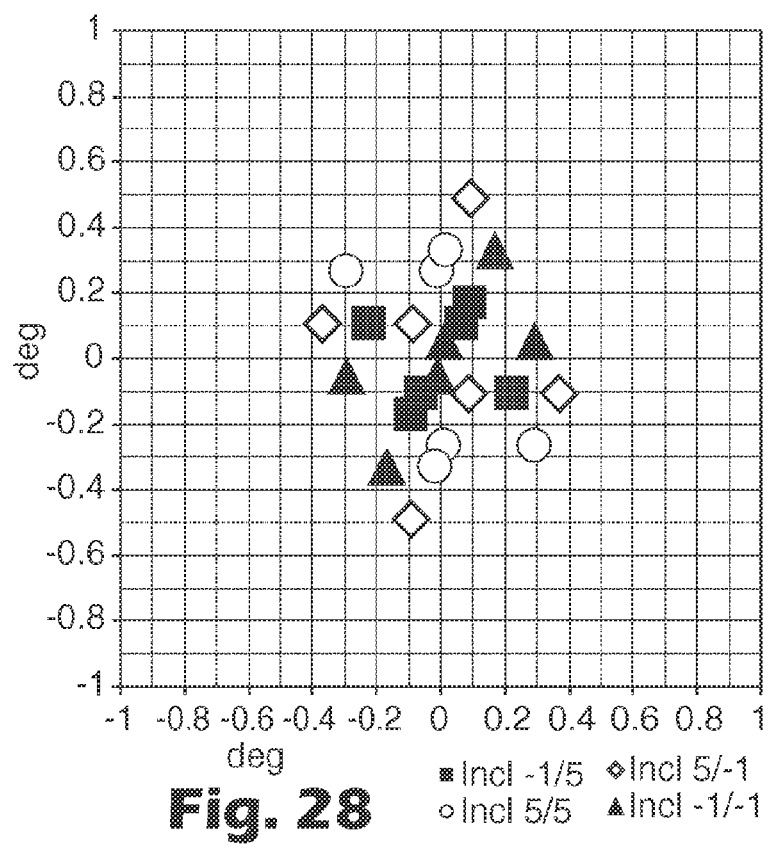
FIG. 28 depicts a spot diagram for cubes of the same geometry as FIG. 29 except that the skew is −7 arc minutes rather than +7 arc minutes.

FIG. 28 depicts the return spot diagram resulting from the same geometry as FIG. 27, except skew is −7 arc minutes instead of +7 arc minutes for all side grooves. The spot diagram is again uniformly distributed in comparison with FIGS. 24-26 as well as complementary to the spot diagram shown in FIG. 27. The dihedral errors for this example of varying inclination are presented in Table 6. Note once again that dihedral 1-2 and dihedral 1-3 vary in opposition, differing both in magnitude and/or sign. The change in sign of the skew has resulted in a switch in the magnitude and sign of dihedral 1-2 and 1-3 in comparison to Table 5.

TABLE 6

| Inclination (arc minutes) | Dihedral 1-2 (arc minutes) | Dihedral 3-2 (arc minutes) | Dihedral 1-3 (arc minutes) |
| --- | --- | --- | --- |
| −1, 5 | −3.7 | 3.0 | 0.8 |
| 5, 5 | −7.9 | 3.0 | 0.8 |
| 5, −1 | −7.9 | 3.0 | 5.1 |
| −1, −1 | −3.7 | 3.0 | 5.1 |

Figure 29:
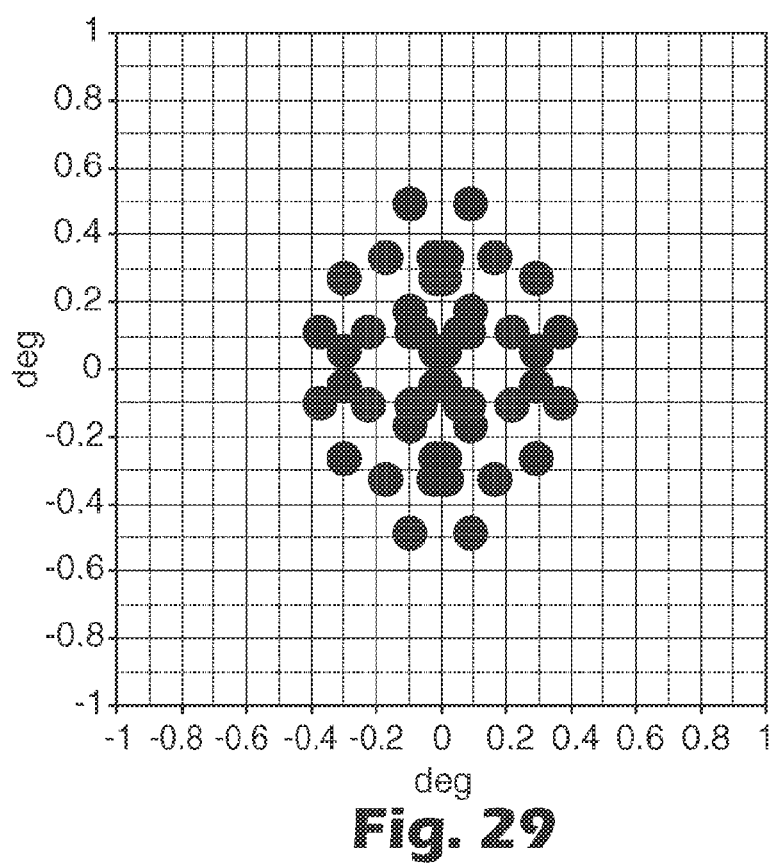
FIG. 29 depicts a spot diagram for the combination of FIG. 27 and FIG. 28.

The positive and negative skews of the two preceding examples may be combined, providing the spot diagram of FIG. 29. This combination might be achieved by machining half of the lamina with +7 arc minutes of skew and the other half with −7 arc minutes of skew. Alternatively, the positive and negative skew could be combined within each lamina, resulting in both skew and inclination being varied concurrently within a given lamina. In the latter case, a small number of other return spots would result from the cubes positioned at the boundary of the positive and negative skew sections. The spot diagram is particularly uniformly distributed in comparison with FIGS. 24-26 as it results from the combination of the spot diagrams in FIGS. 27 and 28. A combination of the dihedral errors as shown in Tables 5 and 6 are associated with this spot diagram, with dihedral 1-2 and dihedral 1-3 differing in magnitude and sign, varying in opposition.

Figure 30:
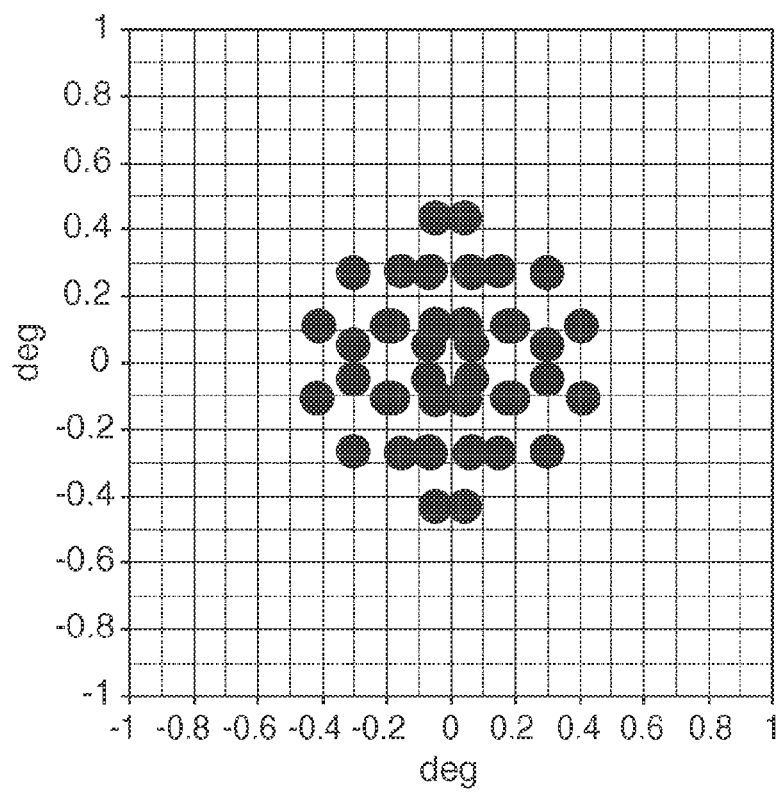
FIG. 30 comprises the same angle errors, skews, and inclinations as FIG. 29 except that the cubes are forward canted by 7.47 degrees.

FIG. 30 presents the same half angle errors, skews, and inclinations as FIG. 29 except for cubes that are forward canted by 7.47°. The spot diagram is also uniformly distributed although slightly different than the backward canted spot diagram of FIG. 29. The dihedral errors associated with this spot diagram are summarized in Table 7, where dihedral 1-2 and dihedral 1-3 again vary in opposition, including at least one cube where dihedral 1-2 and dihedral 1-3 differ in magnitude and/or sign.

TABLE 7

| Inclination (arc minutes) | Skew (arc minutes) | Dihedral 1-2 (arc minutes) | Dihedral 3-2 (arc minutes) | Dihedral 1-3 (arc minutes) |
| --- | --- | --- | --- | --- |
| −1, 5 | 7 | 4.3 | 3.0 | −7.2 |
| 5, 5 | 7 | 0.1 | 3.0 | −7.2 |
| 5, −1 | 7 | 0.1 | 3.0 | −2.9 |
| −1, −1 | 7 | 4.3 | 3.0 | −2.9 |
| −1, 5 | −7 | −2.9 | 3.0 | 0.1 |
| 5, 5 | −7 | −7.2 | 3.0 | 0.1 |
| 5, −1 | −7 | −7.2 | 3.0 | 4.3 |
| −1, −1 | −7 | −2.9 | 3.0 | 4.3 |

Figure 31:
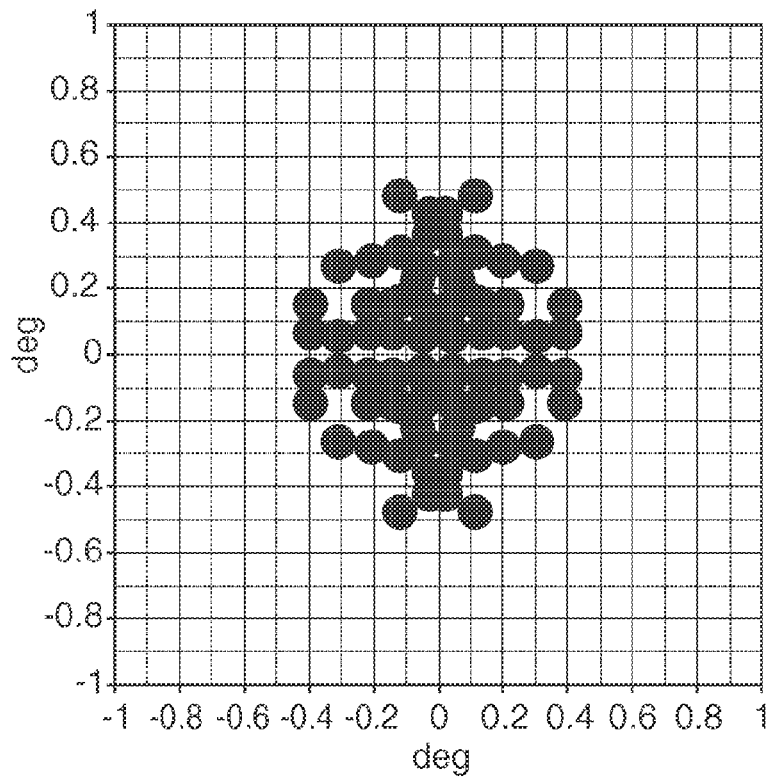
FIG. 31 depicts a spot diagram for cubes that are sideways canted by 6.02 degrees having various skews and inclinations.

The same skew and inclination combinations may also be utilized advantageously in combination with sideways canted cube corners to provide a uniformly distributed spot diagram. Sideways canted cubes, as previously discussed, comprise two different cube orientations within the same row. Preferably, care should be taken to apply the combinations of skew and/or inclination equally to both types of cube in a given row (e.g., alpha (α) and beta (β)) in order to obtain uniform performance at various entrance and orientation angle combinations. The return spot diagram for cubes that are sideways canted by 6.03° (FIG. 6, alignment angle 90° or 270°) utilizing skew and inclination is shown in FIG. 31. The same combinations of +7 and −7 arc minutes of skew with −1 and 5 arc minutes of inclination were applied equally to both the alpha (α) and beta (β) cubes. Half angle errors for the side grooves are +1.5 arc minutes on each side (dihedral 2-3 and side groove angle error of +3 arc minutes) and primary groove error is zero. The spot diagram is very uniformly distributed in observation and presentation angle. The dihedral errors associated with this spot diagram are summarized in Table 8, where dihedral 1-2 and dihedral 1-3 again vary in opposition, including at least one cube where dihedral 1-2 and dihedral 1-3 differ in magnitude and/or sign.

TABLE 8

| Skew (arc minutes) | Inclination (arc minutes) | Inclination (arc minutes) | Dihedral 1-2 (arc minutes) | Dihedral 3-2 (arc minutes) | Dihedral 1-3 (arc minutes) | Lower Included angle (° C.) | Upper Included angle (° C.) |
| --- | --- | --- | --- | --- | --- | --- | --- |
| 7 | −1 | −1 | 4.3 | 3.0 | −3.9 | 52.387 | 37.613 |
| 7 | −1 | 5 | 5.1 | 3.0 | −7.4 | 37.613 | 52.387 |
| 7 | 5 | 5 | −0.5 | 3.0 | −7.6 | 52.387 | 37.613 |
| 7 | 5 | −1 | 1.5 | 3.0 | −2.7 | 37.613 | 52.387 |
| 7 | −1 | 5 | 4.3 | 3.0 | −7.6 | 52.387 | 37.613 |
| 7 | 5 | 5 | 1.5 | 3.0 | −7.4 | 37.613 | 52.387 |
| 7 | 5 | −1 | −0.5 | 3.0 | −3.9 | 52.387 | 37.613 |
| 7 | −1 | −1 | 5.1 | 3.0 | −2.7 | 37.613 | 52.387 |
| −7 | −1 | −1 | −3.9 | 3.0 | 4.3 | 37.613 | 52.387 |

TABLE 8-continued

| Skew (arc minutes) | Inclination (arc minutes) | Inclination (arc minutes) | Dihedral 1-2 (arc minutes) | Dihedral 3-2 (arc minutes) | Dihedral 1-3 (arc minutes) | Lower Included angle (° C.) | Upper Included angle (° C.) |
|---|---|---|---|---|---|---|---|
| −7 | −1 | 5  | −2.7 | 3.0 | 1.5  | 52.387 | 37.613 |
| −7 | 5  | 5  | −7.6 | 3.0 | −0.5 | 37.613 | 52.387 |
| −7 | 5  | −1 | −7.4 | 3.0 | 5.1  | 52.387 | 37.613 |
| −7 | −1 | 5  | −3.9 | 3.0 | −0.5 | 37.613 | 52.387 |
| −7 | 5  | 5  | −7.4 | 3.0 | 1.5  | 52.387 | 37.613 |
| −7 | 5  | −1 | −7.6 | 3.0 | 4.3  | 37.613 | 52.387 |
| −7 | −1 | −1 | −2.7 | 3.0 | 5.1  | 52.387 | 37.613 |

A characteristic of the exemplary cube corner elements of Tables 5-8 is the formation of at least one and typically a plurality of PG cube corner elements in a row having three dihedral angle errors wherein the dihedral angle errors are different from each other. Another characteristic is that the dihedral angle errors, and thus the skew and/or inclination, is arranged in a repeating pattern throughout a lamina or row of adjacent cube corner elements. Further the adjacent lamina or row is preferably optically identical except rotated 180° about the z-axis forming pairs of laminae or pairs of rows.

Methods of machining laminae and forming a master tool comprising a plurality of laminae is known, such as described in U.S. Pat. No. 6,257,860 (Lutrell et al.). For embodiments wherein the side grooves are substantially free of skew and/or inclination, side grooves may be formed in a plurality of stacked laminae, such as described in U.S. Pat. No. 6,257,860 (Lutrell et al.) and U.S. Pat. No. 6,159,407 (Krinke et al.).

Accordingly, further described herein are methods of machining laminae by providing a lamina or laminae and forming V-shaped grooves on working surface 16 of the lamina wherein the grooves are formed with any one or combinations of the features previously described.

In general, the lamina(e) may comprise any substrate suitable for forming directly machined grooves on the edge. Suitable substrates machine cleanly without burr formation, exhibit low ductility and low graininess and maintain dimensional accuracy after groove formation. A variety of machinable plastics or metals may be utilized. Suitable plastics comprise thermoplastic or thermoset materials such as acrylics or other materials. Machinable metals include aluminum, brass, copper, electroless nickel, and alloys thereof. Preferred metals include non-ferrous metals. Suitable lamina material may be formed into sheets by for example rolling, casting chemical deposition, electro-deposition or forging. Preferred machining materials are typically chosen to minimize wear of the cutting tool during formation of the grooves.

The diamond tools suitable for use are of high quality such as diamond tools that can be purchased from K&Y Diamond (Mooers, N.Y.) or Chardon Tool (Chardon, Ohio). In particular, suitable diamond tools are scratch free within 10 mils of the tip, as can be evaluated with a 2000× white light microscope. Typically, the tip of the diamond has a flat portion ranging in size from about 0.00003 inches (0.000762 mm) to about 0.00005 inches (0.001270 mm). Further, the surface finish of suitable diamond tools preferably have a roughness average of less than about 3 nm and a peak to valley roughness of less than about 10 nm. The surface finish can be evaluated by forming a test cut in a machinable substrate and evaluating the test cut with a micro-interferometer, such as can be purchased from Wyko (Tucson, Ariz.), a division of Veeco.

The V-shaped grooves are formed with a diamond-tooling machine that is capable of forming each groove with fine precision. Moore Special Tool Company, Bridgeport, Conn.; Precitech, Keene, N.H.; and Aerotech Inc., Pittsburgh, Pa., manufacture suitable machines for such purpose. Such machines typically include a laser interferometer-positioning device. A suitable precision rotary table is commercially available from AA Gage (Sterling Heights, Mich.); whereas a suitable micro-interferometer is commercially available from Zygo Corporation (Middlefield, Conn.) and Wyko (Tucson, Ariz.) a division of Veeco. The precision (i.e., point to point positioning) of the groove spacing and groove depth is preferably at least as precise as +/−500 nm, more preferably at least as precise as +/−250 nm and most preferably at least as precise as +/−100 nm. The precision of the groove angle is at least as precise as +/−2 arc minutes (+/−0.033 degrees), more preferably at least as precise as +/−1 arc minute (+/−0.017 degrees), even more preferably at least at precise as +/−½ arc minute (+/−0.0083 degrees), and most preferably at least as precise as +/−¼ arc minute (+/−0.0042 degrees) over the length of the cut (e.g., the thickness of the lamina). Further, the resolution (i.e., ability of groove forming machine to detect current axis position) is typically at least about 10% of the precision. Hence, for a precision of +/−100 nm, the resolution is at least +/−10 nm. Over short distances (e.g., about 10 adjacent parallel grooves), the precision is approximately equal to the resolution. In order to consistently form a plurality of grooves of such fine accuracy over duration of time, the temperature of the process is maintained within +/−0.1° C. and preferably within +/−0.01° C.

While the change in shape of a single cube corner element due to skew and/or inclination is small with respect to a single element (e.g., limited primarily to changes in the dihedral angles), it is evident that forming skewed and/or inclined grooves in a stack of laminae may be problematic. Since the side grooves deviate from parallel up to as much as 1°, significantly varying cube geometries may be produced across the stack. These variations increase as the stack size increases. The calculated maximum number of laminae that can be machined concurrently (i.e., in a stack) without creating significantly varying cube geometries is as few as two laminae (e.g., for 1° skew, 0.020 inch (0.508 mm) thick lamina with 0.002 inch (0.0508 mm) side groove spacing).

Due to the problems of machining stacks of laminae having skewed and/or inclined side grooves, in the practice of such embodiments the side grooves are preferably formed in individual laminae with a groove-forming machine. A preferred method for forming grooves on the edge portion of individual laminae, assembling the laminae into a master tool, and replicating the microstructured surface of the assembled laminae is described in U.S. Pat. No. 7,174,619 entitled "Methods of Making Microstructured Lamina and Apparatus" filed Mar. 6, 2003, incorporated herein by reference.

To form a master tool of suitable size for forming retroreflective sheeting, a plurality of toolings (also referred to as tiles) are formed by electroplating the surface of the master tool to form negative copies, subsequently electroplating the negative copies to form positive copies, electroplating the positive copies to form a second generation negative copies, etc. The positive copy has the same cube corner element structure as the master tool, whereas the negative copy is the cube cavity replica. Accordingly, a negative copy tool is employed to make a positive copy (i.e., cube corner element) sheeting whereas, a positive copy tool is employed to make a negative copy (i.e., cube corner cavity) sheeting. Further, retroreflective sheeting may comprise combination of cube corner elements and cube corner cavity microstructures. Electroforming techniques such as described in U.S. Pat. Nos. 4,478,769 and 5,156,863 (Pricone) as well as U.S. Pat. No. 6,159,407 (Krinke) are known. Tiling such toolings together can then assemble a master tool of the desired size. In the present disclosure, the toolings are typically tiled in the same orientation.

As used herein, "sheeting" refers to a thin piece of polymeric (e.g., synthetic) material upon which cube corner microstructures have been formed. The sheeting may be of any width and length, such dimension only being limited by the equipment (e.g., width of the tool, width of the slot die orifice, etc.) from which the sheeting was made. The thickness of retroreflective sheeting typically ranges from about 0.004 inches (0.1016 mm) to about 0.10 inches (2.54 mm). Preferably the thickness of retroreflective sheeting is less than about 0.020 inches (0.508 mm) and more preferably less than about 0.014 inches (0.3556 mm). The retroreflective sheeting may further include surface layers such as seal films or overlays. In the case of retroreflective sheeting, the width is typically at least 30 inches (122 cm) and preferably at least 48 inches (76 cm). The sheeting is typically continuous in its length for up to about 50 yards (45.5 m) to 100 yards (91 m) such that the sheeting is provided in a conveniently handled roll-good. Alternatively, however, the sheeting may be manufactured as individual sheets rather than as a roll-good. In such embodiments, the sheets preferably correspond in dimensions to the finished article. For example, the retroreflective sheeting, may have the dimensions of a standard U.S. sign (e.g., 30 inches by 30 inches (76 cm by 76 cm) and thus the microstructured tool employed to prepare the sheeting may have about the same dimensions. Smaller articles such as license plates or reflective buttons may employ sheeting having correspondingly smaller dimensions.

The retroreflective sheet is preferably manufactured as an integral material, i.e., wherein the cube-corner elements are interconnected in a continuous layer throughout the dimension of the mold, the individual elements and connections therebetween comprising the same material. The surface of the sheeting opposing the microprismatic surface is typically smooth and planar, also being referred to as the "land layer". The thickness of the land layer (i.e., the thickness excluding that portion resulting from the replicated microstructure) is between 0.001 and 0.100 inches and preferably between 0.003 and 0.010 inches. Manufacture of such sheeting is typically achieved by casting a fluid resin composition onto the tool and allowing the composition to harden to form a sheet. A preferred method for casting fluid resin onto the tool is described in U.S. Pat. No. 7,410,604, incorporated herein by reference.

Optionally, however, the tool can be employed as an embossing tool to form retroreflective articles, such as described in U.S. Pat. No. 4,601,861 (Pricone). Alternatively, the retroreflective sheeting can be manufactured as a layered product by casting the cube-corner elements against a preformed film as taught in PCT Application No. WO95/11464 and U.S. Pat. No. 3,684,348, or by laminating a preformed film to preformed cube-corner elements. In doing so the individual cube-corner elements are interconnected by the preformed film. Further, the elements and film are typically comprised of different materials.

In the manufacture of the retroreflective sheeting, it is preferred that the channels of the tool are roughly aligned with the direction of the advancing tool as further described in U.S. Pat. No. 6,884,371, entitled "Methods of Making Retroreflective Sheeting and Articles", filed Mar. 6, 2003. Accordingly, prior to any further manufacturing steps, the primary groove of the sheeting would be substantially parallel to the edge of the roll of the sheeting. The present inventors have found that orienting the channels in this downweb manner allows for faster replication than when the primary groove is oriented cross web. It is surmised that the primary groove and other cube structures combine to form channels for improved resin flow.

Suitable resin compositions for the retroreflective sheeting are preferably transparent materials that are dimensionally stable, durable, weatherable, and readily formable into the desired configuration. Examples of suitable materials include acrylics, which have an index of refraction of about 1.5, such as Plexiglas brand resin manufactured by Rohm and Haas Company; polycarbonates, which have an index of refraction of about 1.59; reactive materials such as thermoset acrylates and epoxy acrylates; polyethylene based ionomers, such as those marketed under the brand name of SURLYN by E. I. Dupont de Nemours and Co., Inc.; (poly)ethylene-co-acrylic acid; polyesters; polyurethanes; and cellulose acetate butyrates. Polycarbonates are particularly suitable because of their toughness and relatively higher refractive index, which generally contributes to improved retroreflective performance over a wider range of entrance angles. These materials may also include dyes, colorants, pigments, UV stabilizers, or other additives.

A specular reflective coating such as a metallic coating can be placed on the backside of the cube-corner elements. The metallic coating can be applied by known techniques such as vapor depositing or chemically depositing a metal such as aluminum, silver, or nickel. A primer layer may be applied to the backside of the cube-corner elements to promote the adherence of the metallic coating. In addition to or in lieu of a metallic coating, a seal film can be applied to the backside of the cube-corner elements; see, for example, U.S. Pat. Nos. 4,025,159 and 5,117,304. The seal film maintains an air interface at the backside of the cubes that enables total internal reflection at the interface and inhibits the entry of contaminants such as soil and/or moisture. Further a separate overlay film may be utilized on the viewing surface of the sheeting for improved (e.g., outdoor) durability or to provide an image receptive surface. Indicative of such outdoor durability is maintaining sufficient brightness specifications such as called out in ASTM D49560-1a after extended durations of weathering (e.g., 1 year, 3 years). Further the CAP Y whiteness is preferably greater than 30 before and after weathering.

An adhesive layer also can be disposed behind the cube-corner elements or the seal film to enable the cube-corner retroreflective sheeting to be secured to a substrate. Suitable substrates include wood, aluminum sheeting, galvanized steel, polymeric materials such as polymethyl methacrylates, polyesters, polyamids, polyvinyl fluorides, polycarbonates, polyvinyl chlorides, polyurethanes, and a wide variety of laminates made from these and other materials.

With reference to FIG. 6, the laminae are preferably aligned vertically. In doing so, upon replication a row of elements is derived from each lamina. Alternatively, however, these same optical features may be derived from horizontally aligned laminae. The common plane that a face of each element within a row share to within about 3-4 microns may vary slightly (e.g., less than 1°) for horizontally aligned laminae. It is evident that a row of cubes was derived from a lamina due to the presence of slight vertical or horizontal misalignments as can be observed with, for example, scanning electron microscopy.

Regardless of the method of making the retroreflective sheeting or whether the master tool was derived from a lamina technique or other technique, the sheeting has certain unique optical features that can be detected by viewing the sheeting with a microscope or interferometer as previously described.

In one aspect, the retroreflective sheeting comprises a row of cube corner elements or an array of cube corner element wherein the included angle between a first and second concurrent element in a row differs from the included angle between a second and a third concurrent element in the row. With respect to the sheeting, the row is defined by the elements wherein a face of each element within the row shares a common plane (e.g., primary groove face, working surface 12 or 14). The magnitude of the difference in included angle between adjacent cubes as well as other preferred characteristics (e.g., arranged in a repeating pattern, common peak height, bisector planes that range from being mutually nominally parallel to non-parallel by less than 1°) within a row or array is the same as previous described with respect to the lamina.

Alternatively or in combination thereof, the retroreflective sheeting comprises a row or an array of cube corner elements (e.g., PG cube corner elements) wherein at least a portion of the elements in a row or array are predominantly sideways canted, the elements having an alignment angles between 45° and 135° and/or having an alignment angle between 225° and 315° relative to the dihedral edge that is substantially perpendicular to a row of elements in plan view. In preferred embodiments, the retroreflective sheeting comprises a row of cube corner elements or an array having cube corner elements having each of these alignment angles. Such array is substantially free of predominantly forward canted or predominantly backward canted cube corner elements. The retroreflective sheeting comprising predominantly sideways canted cube corner elements may further comprise any of the characteristics previously described with regard to the lamina.

Alternatively or in combination thereof, the retroreflective sheeting comprises skewed and/or inclined grooves. Hence, the row or the array wherein at least two adjacent grooves and preferably all the grooves of the (e.g., side) groove set are non-parallel by amount ranging from greater than nominally parallel to about 1° and may further include the various attributes described with regard to lamina comprising this feature.

In another aspect, alone or in combination with differing included angles and/or sideways canting, the retroreflective sheeting may comprise a row or elements or an array wherein the grooves of the side groove set are nominally parallel to each other, yet range from being nominally parallel to non-parallel to reference plane 28.

The retroreflective sheeting is useful for a variety of uses such as traffic signs, pavement markings, vehicle markings and personal safety articles, in view of its high retroreflected brightness. The coefficient of retroreflection, $R_A$, may be measured according to US Federal Test Method Standard 370 at −4° entrance, 0° orientation, at various observation angles. The resulting sheeting meets brightness specifications called out in ASTM D4956-1a "The Standard Specification for Retroreflective Sheeting for Traffic Control" for Type IX sheeting. Additionally, specified brightness minimums are significantly exceeded for −4° entrance, an average of 0° and 90° orientation, 0° presentation and various observation angles. The brightness is preferably at least 625 candelas per lux per square meter (CPL), more preferably at least 650 CPL, even more preferably at least 675 CPL, and most preferably at least 700 CPL at an observation angle of 0.2°. Alternatively, and preferably in addition thereto, the brightness at an observation angle of 0.33° is preferably at least 575 CPL, more preferably at least 600 CPL, even more preferably at least 625 CPL, and most preferably at least 650 CPL. In addition or in the alternative, the brightness at an observation angle of 0.5° is preferably at least 375 CPL, more preferably at least 400 CPL, even more preferably at least 425 CPL, and most preferably at least 450 CPL. Further, the brightness at an observation angle of 1.0° is preferably at least 80 CPL, more preferably at least 100 CPL, and most preferably at least 120 CPL. Likewise, the brightness at an observation angle of 1.5° is preferably at least 20 CPL and more preferably at least 25 CPL. The retroreflective sheeting may comprise any combination of brightness criteria just stated.

Improved brightness in the region around 0.5 observation angle (i.e., 0.4 to 0.6) is particularly important for viewing traffic signs (e.g., right should mounted) from passenger vehicles at distances of roughly 200 to 400 feet and for the viewing of traffic signs (e.g., right should mounted) from drivers of large trucks at distances of about 450 to 950 feet.

Objects and advantages of the disclosure are further illustrated by the following examples, but the particular materials and amounts thereof recited in the examples, as well as other conditions and details, should not be construed to unduly limit the disclosure.

Examples 1A and 1B

Grooves were formed in individual lamina, the individual lamina assembled, and the microstructured surface replicated as described in previously cited U.S. Pat. No. 7,174,619. All the machined laminae had the geometry depicted in FIGS. 6 and 7, with slight variations due to varying the half angle error, skew and inclination of the side grooves. The lamina thickness was 0.0075 inches (0.1905 mm) and the side groove spacing was 0.005625 inches (0.1428 mm) except for the slight variations just described. A repeating pattern of eight cubes was sequentially formed on each lamina. This repeating pattern of cubes was formed by varying the half angle errors, skew, and inclination of the side grooves as set forth in forthcoming Tables 10-14. Each row in the tables defines the parameters used during machining of an individual side groove. The cube corner dihedral errors, as defined in FIG. 22, are formed by the two adjacent side grooves that intersect the primary groove surface to form each cube. Hence, the rows defining dihedral angle errors are offset in the table to clarify their adjacent side grooves.

Eight laminae that differed with regard to the angle error and/or skew and/or inclination of the side grooves were formed such that the dihedral angle errors reported in each of the following Tables 10-14 were obtained with the exception of Table 13 wherein the skew of a portion of the side grooves was modified.

Lamina 1 and Lamina 2

The side groove parameters of the first lamina as well as the second lamina, the second lamina being an opposing lamina to the first lamina, are reported in Tables 10 and 11, respectively. The primary groove half angle error was −8 arc minutes for all the primary grooves. Side groove nominal included angles (the angles required to produce orthogonal cubes) were 75.226° and 104.774°. The included angle error for all side grooves was −9.2 arc minutes, resulting in actual side groove included angles of 75.073° and 104.621°. While the included angle error was constant for the side grooves, the half angle errors were varied. Half angle errors for the first lamina type ranged from −14.8 arc minutes to 5.6 arc minutes as shown in column 3 of Table 10. The half angle errors are presented in groups of two (totaling −9.2 arc minutes) corresponding to the two half angles for each side groove. The dihedral 2-3 error results from the combination of half angle errors on adjacent side grooves and is summarized in column 4. Dihedral 2-3 errors varied from −1.6 arc minutes to −16.8 arc minutes for the first lamina.

Skew and inclination are set forth in columns five and six of Table 10, respectively. Skew ranged from −8.0 arc minutes to 15.0 arc minutes for the first lamina. Inclination varied from −6.1 arc minutes to 10.8 arc minutes. The 1-2 and 1-3 dihedral errors resulting from skew and inclination of the side grooves are shown in the final two columns. Note that dihedral errors 1-2 and 1-3 varied in opposition, with at least one cube in the lamina comprising dihedral errors 1-2 and 1-3 with different magnitudes and/or signs.

The side grooves of the second lamina, is summarized in Table 11 and is closely related to the lamina of Table 10. The first and second columns, that set forth the nominal side groove angle as well as side groove included angle error, are identical. All other columns for side groove parameters (half angle errors, skew and inclination) as well as dihedral angle errors are inverted in relation to Table 10. This reflects the fact that an opposing lamina is optically identical to its counterpart except rotated 180° about the z-axis.

Lamina 4, Lamina 6 and Lamina 8

For simplicity, the side groove parameters of the fourth, sixth, and eight lamina that are respectively opposing the third, fifth and seventh lamina are not reiterated since the side grooves parameter have this same inverted relationship as just described.

Lamina 3

The side groove parameter of the third lamina is set forth in Table 12. Primary groove half angle error was −8 arc minutes. The basic geometry (dimensions and nominal side groove included angles) was the same as the first lamina type. The actual included angle error for all side grooves was again −9.2 arc minutes. Half angle errors for the second lamina type side grooves ranged from −14.8 arc minutes to 5.6 arc minutes. Dihedral 2-3 errors varied from −1.6 arc minutes to −16.8 arc minutes. Skew ranged from −14.0 arc minutes to 21.3 arc minutes while inclination varied from −12.7 arc minutes to 16.8 arc minutes for this lamina type. The 1-2 and 1-3 dihedral errors (shown in the final two columns) varied in opposition.

Lamina 5

The groove parameters of the fifth lamina is set forth in Table 13. The primary groove half angle error was −4 arc minutes. The basic geometry (dimensions and nominal side groove included angles) was the same as the preceding laminae. The included angle error for all side grooves was −1.6 arc minutes, resulting in actual side groove included angles of 75.199° and 104.747°. Half angle errors for the third lamina type ranged from −5.2 arc minutes to 3.6 arc minutes. Dihedral 2-3 errors varied from −7.2 arc minutes to 4.0 arc minutes. Skew ranged from −7.0 arc minutes to 9.5 arc minutes while inclination varied from −8.2 arc minutes to 1.4 arc minutes. The 1-2 and 1-3 dihedral errors (shown in the final two columns) varied in opposition.

Lamina 7

The side groove parameter for the seventh lamina is set forth in Table 14. The primary groove half angle error was −4.0 arc minutes. The basic geometry (dimensions and nominal side groove included angles) was the same as the first lamina type. The actual included angle error for all side grooves was again −1.6 arc minutes. Half angle errors ranged from −5.2 arc minutes to 3.6 arc minutes. Dihedral 2-3 errors varied from −7.2 arc minutes to 4.0 arc minutes. Skew ranged from −5.3 arc minutes to 5.3 arc minutes while inclination varied from −2.1 arc minutes to 4.6 arc minutes for this lamina type. The 1-2 and 1-3 dihedral errors (shown in the final two columns) varied in opposition.

A total of 208 laminae were assembled such that the non-dihedral edges of the elements of opposing laminae contacted each other to a precision such that the assembly was substantially free of vertical walls (e.g., walls greater than 0.0001 in lateral dimensions). The laminae were assembled such that the lamina order 1-8 was sequentially repeated throughout the assembly and the structured surface of the assembly was then replicated by electroforming to create a cube cavity tool. The assembly and electroforming process is further described in U.S. Pat. No. 7,174,619.

For Example 1A, the tool was used in a compression molding press with the pressing performed at a temperature of approximately 375° F. (191° C.) to 385° F. (196° C.), a pressure of approximately 1600 psi, and a dwell time of 20 seconds. The molded polycarbonate was then cooled to about 200° F. (100° C.) over 5 minutes.

For Example 2A, molten polycarbonate was cast onto the tool surface as described in previously cited U.S. patent application Ser. No. 10/382,375, filed Mar. 6, 2003. U.S. patent application Ser. No. 10/382,375 was filed concurrently with Provisional Patent Application Ser. No. 60/452,464 to which the present application claims priority.

For both Example 1A and 1B, a dual layer seal film comprising 0.7 mils polyester and 0.85 mils amorphous copolyester was applied to the backside of the cube-corner elements by contacting the amorphous copolyester containing surface to the microstructured polycarbonate film surface in a continuous sealing process. The construction was passed continuously through a rubber nip roll having a Teflon sleeve and a heated steel roll. The surface of the rubber nip roll was about 165° F. and the surface of the heated steel roll was about 405° F. The nip pressure was about 70 pounds/per linear inch and speed was 20 feet per minute. Brightness retention after sealing was about 70%.

The resulting sheeting meets brightness specifications called out in ASTM D4956-1a "The Standard Specification for Retroreflective Sheeting for Traffic Control" for Type IX sheeting. Additionally, specified brightness minimums are significantly exceeded for −4° entrance, an average of 0° and 90° orientation, 0° presentation and various observation angles as follows:

TABLE 9

| Observation Angle | Comparative Retroreflective Sheeting 2 Avg 0/90 CPL | Comparative Retroreflective Sheeting 3 Avg 0/90 CPL | Example 1A Compression Molded Sheeting Avg 0/90 CPL | Example 1B Extrusion Sheeting Avg 0/90 CPL |
|---|---|---|---|---|
| 0.2 | 726 | 489 | 788 | 740 |
| 0.33 | 660 | 432 | 748 | 700 |
| 0.5 | 276 | 348 | 554 | 502 |
| 1 | 37 | 106 | 141 | 162 |
| 1.5 | 13 | 24 | 32 | 35 |

Table 9 shows that the retroreflective sheeting has a higher brightness at each of the indicated observation angles in comparison to Comparative Retroreflective Sheeting 2 and Comparative Retroreflective Sheeting 3. The improved brightness in the region around 0.5 observation angle is particularly important for viewing traffic signs (e.g., right should mounted) from passenger vehicles at distances of roughly 200 to 400 feet and for the viewing of traffic signs (e.g., right should mounted) from drivers of large trucks at distances of about 450 to 950 feet.

The sheeting of Example 1A was found to have a measured uniformity index of 2.04 for total light return within 2.0° observation.

Various modifications and alterations will become apparent to those skilled in the art without departing from the scope and spirit of this disclosure.

TABLE 10

| Nominal Side Groove Included Angle (Deg) | Side Groove Incl. Angle Error (min) | Side Groove Half Angle Errors (min) | Dihedral 2-3 Error (min) | Skew (min) | Inclination (min) | Dihedral 1-3 Error (min) | Dihedral 1-2 Error (min) |
|---|---|---|---|---|---|---|---|
| 75.226 | −9.2 | −7.2 | | 15.0 | 2.5 | | |
| | | −2.0 | −9.2 | | | −16.1 | −6.0 |
| 104.774 | −9.2 | −7.2 | | 0.0 | −0.4 | | |
| | | −2.0 | −9.2 | | | −6.0 | −16.0 |
| 75.226 | −9.2 | −7.2 | | −7.0 | −12.8 | | |
| | | −2.0 | −9.2 | | | −7.0 | −12.8 |
| 104.774 | −9.2 | −7.2 | | −8.0 | 3.1 | | |
| | | −2.0 | −16.8 | | | −4.8 | −5.7 |
| 75.226 | −9.2 | −14.8 | | −7.0 | −6.0 | | |
| | | 5.6 | −1.6 | | | 3.3 | 1.9 |
| 104.774 | −9.2 | −7.2 | | 14.7 | −1.2 | | |
| | | −2.0 | −9.2 | | | −12.7 | −7.0 |
| 75.226 | −9.2 | −7.2 | | −1.0 | 2.5 | | |
| | | −2.0 | −16.8 | | | −5.8 | −4.9 |
| 104.774 | −9.2 | −14.8 | | −6.7 | −6.1 | | |
| | | 5.6 | −1.6 | | | 1.8 | 3.3 |
| 75.226 | −9.2 | −7.2 | | 15.0 | 2.5 | | |
| | | −2.0 | | | | | |

TABLE 11

| Nominal Side Groove Included Angle (Deg) | Side Groove Incl. Angle Error (min) | Side Groove Half Angle Errors (min) | Dihedral 2-3 Error (min) | Skew (min) | Inclination (min) | Dihedral 1-3 Error (min) | Dihedral 1-2 Error (min) |
|---|---|---|---|---|---|---|---|
| 75.226 | −9.2 | −2.0 | | 15.0 | 2.5 | | |
| | | −7.2 | −1.6 | | | 1.8 | 3.3 |
| 104.774 | −9.2 | 5.6 | | −6.7 | −6.1 | | |
| | | −14.8 | −16.8 | | | −5.8 | −4.9 |
| 75.226 | −9.2 | −2.0 | | −1.0 | 2.5 | | |
| | | −7.2 | −9.2 | | | −12.7 | −7.0 |
| 104.774 | −9.2 | −2.0 | | 14.7 | −1.2 | | |
| | | −7.2 | −1.6 | | | 3.3 | 1.9 |
| 75.226 | −9.2 | 5.6 | | −7.0 | −6.0 | | |
| | | −14.8 | −16.8 | | | −4.8 | −5.7 |
| 104.774 | −9.2 | −2.0 | | −8.0 | 3.1 | | |
| | | −7.2 | −9.2 | | | −7.0 | −12.8 |
| 75.226 | −9.2 | −2.0 | | −7.0 | 10.8 | | |
| | | −7.2 | −9.2 | | | −6.0 | −16.0 |
| 104.774 | −9.2 | −2.0 | | 0.0 | −0.4 | | |
| | | −7.2 | −9.2 | | | −16.1 | −6.0 |
| 75.226 | −9.2 | −2.0 | | 15.0 | 2.5 | | |
| | | −7.2 | | | | | |

TABLE 12

| Nominal Side Groove Included Angle (Deg) | Side Groove Incl. Angle Error (min) | Side Groove Half Angle Errors (min) | Dihedral 2-3 Error (min) | Skew (min) | Inclination (min) | Dihedral 1-3 Error (min) | Dihedral 1-2 Error (min) |
|---|---|---|---|---|---|---|---|
| 75.226 | −9.2 | −7.2 | | 21.3 | 2.0 | | |
| | | −2.0 | −9.2 | | | −19.8 | −8.7 |
| 104.774 | −9.2 | −7.2 | | 0.0 | 3.0 | | |
| | | −2.0 | −9.2 | | | −8.7 | −19.7 |
| 75.226 | −9.2 | −7.2 | | −7.2 | 16.8 | | |
| | | −2.0 | −9.2 | | | −10.5 | −15.4 |
| 104.774 | −9.2 | −7.2 | | −14.0 | 2.6 | | |
| | | −2.0 | −16.8 | | | −1.4 | −1.5 |

TABLE 12-continued

| Nominal Side Groove Included Angle (Deg) | Side Groove Incl. Angle Error (min) | Side Groove Half Angle Errors (min) | Dihedral 2-3 Error (min) | Skew (min) | Inclination (min) | Dihedral 1-3 Error (min) | Dihedral 1-2 Error (min) |
|---|---|---|---|---|---|---|---|
| 75.226 | −9.2 | −14.8 |  | −6.7 | −12.7 |  |  |
|  |  | 5.6 | −1.6 |  |  | 7.2 | 5.0 |
| 104.774 | −9.2 | −7.2 |  | 20.5 | −1.4 |  |  |
|  |  | −2.0 | −9.2 |  |  | −15.4 | −10.6 |
| 75.226 | −9.2 | −7.2 |  | −7.0 | 2.0 |  |  |
|  |  | −2.0 | −16.8 |  |  | −1.6 | −1.4 |
| 104.774 | −9.2 | −14.8 |  | −6.7 | −10.5 |  |  |
|  |  | 5.6 | −1.6 |  |  | 5.3 | 7.7 |
| 75.226 | −9.2 | −7.2 |  | 21.3 | 2.0 |  |  |
|  |  | −2.0 |  |  |  |  |  |

TABLE 13

| Nominal Side Groove Included Angle (Deg) | Side Groove Incl. Angle Error (min) | Side Groove Half Angle Errors (min) | Dihedral 2-3 Error (min) | Skew (min) | Inclination (min) | Dihedral 1-3 Error (min) | Dihedral 1-2 Error (min) |
|---|---|---|---|---|---|---|---|
| 75.226 | −1.6 | 0.4 |  | 2.1 | −4.0 |  |  |
|  |  | −2.0 | −1.6 |  |  | −1.4 | 3.3 |
| 104.774 | −1.6 | 0.4 |  | 0.0 | −8.2 |  |  |
|  |  | −2.0 | −1.6 |  |  | 3.3 | −1.3 |
| 75.226 | −1.6 | 0.4 |  | −4.7 | −6.8 |  |  |
|  |  | −2.0 | −1.6 |  |  | 4.7 | −1.7 |
| 104.774 | −1.6 | 0.4 |  | 5.1 | 1.4 |  |  |
|  |  | −2.0 | −7.2 |  |  | −6.8 | −7.6 |
| 75.226 | −1.6 | −5.2 |  | −7.0 | 1.0 |  |  |
|  |  | 3.6 | 4.0 |  |  | 1.5 | −1.5 |
| 104.774 | −1.6 | 0.4 |  | 0.4 | −1.8 |  |  |
|  |  | −2.0 | −1.6 |  |  | −1.9 | 4.8 |
| 75.226 | −1.6 | 0.4 |  | 9.5 | −1.8 |  |  |
|  |  | −2.0 | −7.2 |  |  | −7.5 | −6.8 |
| 104.774 | −1.6 | −5.2 |  | −5.4 | 1.2 |  |  |
|  |  | 3.6 | 4.0 |  |  | −1.4 | 1.4 |
| 75.226 | −1.6 | 0.4 |  | 2.1 | −4.0 |  |  |
|  |  | −2.0 |  |  |  |  |  |

TABLE 14

| Nominal Side Groove Included Angle (Deg) | Side Groove Incl. Angle Error (min) | Side Groove Half Angle Errors (min) | Dihedral 2-3 Error (min) | Skew (min) | Inclination (min) | Dihedral 1-3 Error (min) | Dihedral 1-2 Error (min) |
|---|---|---|---|---|---|---|---|
| 75.226 | −1.6 | 0.4 |  | 4.7 | 3.6 |  |  |
|  |  | −2.0 | −1.6 |  |  | −7.7 | −1.5 |
| 104.774 | −1.6 | 0.4 |  | 0.0 | −2.1 |  |  |
|  |  | −2.0 | −1.6 |  |  | −1.5 | −7.7 |
| 75.226 | −1.6 | 0.4 |  | −4.7 | 3.6 |  |  |
|  |  | −2.0 | −1.6 |  |  | −1.6 | −6.8 |
| 104.774 | −1.6 | 0.4 |  | 0.0 | 4.6 |  |  |
|  |  | −2.0 | −7.2 |  |  | −6.8 | −7.6 |
| 75.226 | −1.6 | −5.2 |  | −4.7 | 3.5 |  |  |
|  |  | 3.6 | 4.0 |  |  | −1.6 | −1.6 |
| 104.774 | −1.6 | 0.4 |  | 5.3 | 1.3 |  |  |
|  |  | −2.0 | −1.6 |  |  | −6.8 | −1.6 |
| 75.226 | −1.6 | 0.4 |  | 4.6 | 3.4 |  |  |
|  |  | −2.0 | −7.2 |  |  | −7.5 | −6.8 |
| 104.774 | −1.6 | −5.2 |  | −5.3 | 1.3 |  |  |
|  |  | 3.6 | 4.0 |  |  | −1.6 | −1.6 |
| 75.226 | −1.6 | 0.4 |  | 4.7 | 3.6 |  |  |
|  |  | −2.0 |  |  |  |  |  |

The invention claimed is:

1. Retroreflective sheeting, comprising:
a plurality of preferred geometry cube corner elements having a hexagonal shape when viewed in plan view; at least some of the preferred geometry cube corner elements including at least one of skew or inclination; and
wherein the sheeting exhibits an average brightness at 0° and 90° orientation according to ASTM D4596-1a of at least 375 candelas/lux/m$^2$ for an entrance angle of −4° and an observation angle of 0.5°.

2. The retroreflective sheeting of claim 1 wherein the average brightness is at least 400 candelas/lux/m$^2$.

3. The retroreflective sheeting of claim 1 wherein the average brightness is at least 450 candelas/lux/m$^2$.

4. The retroreflective sheeting of claim 1 wherein the average brightness at 0° and 90° is at least 625 candelas/lux/m$^2$ for an entrance angle of −4° and an observation angle of 0.2°.

5. The retroreflective sheeting of claim 1 wherein the average brightness at 0° and 90° is at least 575 candelas/lux/m$^2$ for an entrance angle of −4° and an observation angle of 0.33°.

6. The retroreflective sheeting of claim 1 wherein the average brightness at 0° and 90° is at least 80 candelas/lux/m$^2$ for an entrance angle of −4° and an observation angle of 1.0°.

7. The retroreflective sheeting of claim 1 wherein the average brightness at 0° and 90° is at least 20 candelas/lux/m$^2$ for an entrance angle of −4° and an observation angle of 1.5°.

8. The retroreflective sheeting of claim 1 wherein the sheeting further comprises a seal film.

9. The retroreflective sheeting of claim 1 wherein the sheeting further comprises a specular reflective coating.

\* \* \* \* \*

UNITED STATES PATENT AND TRADEMARK OFFICE
CERTIFICATE OF CORRECTION

PATENT NO. : 8,998,428 B2
APPLICATION NO. : 14/504471
DATED : April 7, 2015
INVENTOR(S) : Kenneth Smith It is certified that error appears in the above-identified patent and that said Letters Patent is hereby corrected as shown below:

Column 1
Line 9, Delete "lamina;" and insert -- laminae, --, therefor.

Column 3
Line 20, Delete "(Van Armin)," and insert -- (Van Arnam), --, therefor.

Column 4
Line 28, Delete "and or" and insert -- and/or --, therefor.

Column 10
Line 62, Delete "and) 104.774°" and insert -- and 104.774°) --, therefor.

Column 12
Line 44, Delete "(α)" and insert -- (α') --, therefor.

Column 17
Line 42, Delete "machining" and insert -- machining. --, therefor.

Column 18
Line 15, Delete "machining" and insert -- machining. --, therefor.

Column 23
Line 55, Delete "2000x" and insert -- 2000X --, therefor.

Column 26
Line 61, Delete "polyamids," and insert -- polyamides, --, therefor.

Column 32
Line 9 (Table 10), Delete "-12.8" and insert -- -10.8 --, therefor.

Signed and Sealed this
Ninth Day of February, 2016

Michelle K. Lee
*Director of the United States Patent and Trademark Office*